United States Patent
Parthasarathy et al.

(10) Patent No.: US 10,110,712 B2
(45) Date of Patent: Oct. 23, 2018

(54) EFFICIENT PACKET CLASSIFICATION FOR DYNAMIC CONTAINERS

(71) Applicant: Nicira, Inc., Palo Alto, CA (US)

(72) Inventors: Mohan Parthasarathy, Cupertino, CA (US); Jayant Jain, Cupertino, CA (US); Xinhua Hong, Milpitas, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 6 days.

(21) Appl. No.: 14/295,559

(22) Filed: Jun. 4, 2014

(65) Prior Publication Data

US 2015/0358434 A1 Dec. 10, 2015

(51) Int. Cl.
*H04L 29/06* (2006.01)
*H04L 12/935* (2013.01)
*H04L 12/851* (2013.01)

(52) U.S. Cl.
CPC .......... *H04L 69/22* (2013.01); *H04L 49/3009* (2013.01); *H04L 47/2441* (2013.01); *H04L 69/12* (2013.01)

(58) Field of Classification Search
CPC ..... H04L 12/56; H04L 45/00; H04L 47/2441; H04L 45/306; H04L 12/58; H04L 29/06; H04L 29/08; H04L 67/2814; H04L 69/329; H04L 67/14; H04L 67/1002; H04L 67/1014; H04L 67/1023; H04L 67/2819; H04L 12/5835; H04L 12/5895; H04L 51/066
See application file for complete search history.

(56) References Cited

U.S. PATENT DOCUMENTS

| | | |
|---|---|---|
| 6,219,699 B1 | 4/2001 | McCloghrie et al. |
| 6,496,935 B1 | 12/2002 | Fink et al. |
| 6,505,192 B1 | 1/2003 | Godwin et al. |
| 7,079,544 B2 | 7/2006 | Wakayama et al. |
| 7,606,260 B2 | 10/2009 | Oguchi et al. |
| 8,825,900 B1 | 9/2014 | Gross, IV et al. |
| 8,856,518 B2 | 10/2014 | Sridharan et al. |
| 2002/0089937 A1 | 7/2002 | Venkatachary et al. |
| 2003/0028606 A1 | 2/2003 | Koopmans et al. |

(Continued)

FOREIGN PATENT DOCUMENTS

| | | |
|---|---|---|
| EP | 1422884 | 5/2004 |
| WO | PCT/US2014/072876 | 12/2014 |
| WO | PCT/US2014/072878 | 12/2014 |

OTHER PUBLICATIONS

International Search Report and Written Opinion of PCT/US2014/072876, dated Sep. 14, 2015, Nicira, Inc.

(Continued)

*Primary Examiner* — Jae Y Lee
*Assistant Examiner* — Aixa Guadalupe-Cruz
(74) *Attorney, Agent, or Firm* — Adeli LLP

(57) ABSTRACT

A novel algorithm for packet classification that is based on a novel search structure for packet classification rules is provided. Addresses from all the containers are merged and maintained in a single Trie. Each entry in the Trie has additional information that can be traced back to the container from where the address originated. This information is used to keep the Trie in sync with the containers when the container definition dynamically changes.

20 Claims, 15 Drawing Sheets

(56) References Cited

U.S. PATENT DOCUMENTS

| | | | |
|---|---|---|---|
| 2003/0053448 A1* | 3/2003 | Craig | H04L 67/2814 370/353 |
| 2004/0103086 A1 | 5/2004 | Vinnakota et al. | |
| 2004/0213235 A1 | 10/2004 | Marshall et al. | |
| 2005/0053079 A1 | 3/2005 | Havala | |
| 2006/0029056 A1 | 2/2006 | Perera et al. | |
| 2006/0206655 A1 | 9/2006 | Chappell et al. | |
| 2006/0221954 A1* | 10/2006 | Narayan | H04L 45/00 370/389 |
| 2006/0259583 A1 | 11/2006 | Matsuura | |
| 2007/0160200 A1 | 7/2007 | Ishikawa et al. | |
| 2008/0144532 A1 | 6/2008 | Chamarajanagar et al. | |
| 2008/0267177 A1 | 10/2008 | Johnson et al. | |
| 2009/0135826 A1* | 5/2009 | Kim | H04L 47/2441 370/392 |
| 2009/0161547 A1 | 6/2009 | Riddle et al. | |
| 2010/0043067 A1 | 2/2010 | Varadhan et al. | |
| 2010/0121975 A1 | 5/2010 | Sinha et al. | |
| 2010/0165874 A1 | 7/2010 | Brown et al. | |
| 2010/0175124 A1* | 7/2010 | Miranda | H04L 63/0263 726/13 |
| 2010/0275199 A1 | 10/2010 | Smith et al. | |
| 2012/0066410 A1 | 3/2012 | Stefanakis et al. | |
| 2012/0079478 A1 | 3/2012 | Galles et al. | |
| 2012/0159132 A1 | 6/2012 | Abel et al. | |
| 2013/0033993 A1 | 2/2013 | Cardona et al. | |
| 2014/0056151 A1 | 2/2014 | Petrus et al. | |
| 2014/0115578 A1 | 4/2014 | Cooper et al. | |
| 2014/0358886 A1 | 12/2014 | Westlund et al. | |
| 2015/0019748 A1 | 1/2015 | Gross, IV et al. | |

OTHER PUBLICATIONS

U.S. Appl. No. 14/295,553, filed Jun. 4, 2014, Parthasarathy, Mohan, et al.

International Search Report and Written Opinion of PCT/US2014/072878, dated Apr. 29, 2015, Nicira, Inc.

Anwer, Muhammad Bilal, et al., "Building a Fast, Virtualized Data Plane with Programmable Hardware," Aug. 17, 2009, pp. 1-8, VISA'09, ACM, Barcelona, Spain.

Author Unknown, "Network Functions Virtualisation; Infrastructure Architecture; Architecture of the Hypervisor Domain," Draft ETSI GS NFV-INF 004 V0.3.1, May 28, 2014, pp. 1-50, France.

Koponen, Teemu, et al., "Network Virtualization in Multi-tenant Datacenters," Aug. 2013, pp. 1-22, VMware, Inc., Palo Alto, California, USA.

Le Vasseur, Joshua, et al., "Standardized but Flexible I/O for Self-Virtualizing Devices," Month Unknown, 2008, pp. 1-7.

Peterson, Larry L., et al., "OS Support for General-Purpose Routers," 6 pages, Department of Computer Science, Princeton University, Princeton, New Jersey, USA.

Pettit, Justin, et al., "Virtual Switching in an Era of Advanced Edges," Sep. 2010, pp. 1-7, USA.

Spalink, Tammo, et al., "Building a Robust Software-Based Router Using Network Processors," Month Unknown, 2001, pp. 216-229, ACM, Banff, Canada.

Turner, Jon, et al., "Supercharging PlanetLab—A High Performance, Multi-Application Overlay Network Platform," SIGCOMM-07, Aug. 27-31, 2007, 12 pages, ACM, Koyoto, Japan.

* cited by examiner

EFFICIENT PACKET CLASSIFICATION FOR DYNAMIC CONTAINERS

BACKGROUND

Packet classification is the process of finding the highest priority rule that matches the packet. Rules specify the fields of the packet that should be matched e.g., source address, destination address, etc. With the advent of network virtualization and distributed firewall, the rules no longer point to addresses but points to a container which in turn points to a set of addresses. Most of the current literature deals with optimizing the classification for rules which point at addresses directly. None of them directly deal with optimizing rules that point at containers.

There are some possible methods to deal with container-based rules. One possible method is to enumerate the rules for the containers it points to. For example, if the container "Web-Cont" has 100 addresses and the container "App-Cont" has 100 addresses, one would add 10000 rules for every source-destination address pair. Another possible method is to lookup the containers for each container-based rule when determining whether the rule is a match for the incoming packet. However, since there could be many container-based rules for implementing the firewall, looking up containers for every rule would make the search for matching rules extremely slow.

Furthermore, since each rule in the firewall is associated with a priority number, one must examine the rules sequentially. One cannot skip examining any rule without knowing whether the skipped rule is a match for the incoming packet or not.

SUMMARY

To search for a matching rule from a rules database that includes rules that are defined with respect to containers of IP addresses, some embodiments use a container-linking data structure that is derived from the content of the rules database. The container-linking data structure includes address nodes that corresponds to all addresses that are either explicitly recited in rules or included in containers. Each address node has links indicating which containers encompass the address of the entry, and which rules explicitly recite the address as source or destination. In some embodiments, the address nodes of the container-linking data structure are organized as a prefix tree or Trie. The container-linking data structure also includes container nodes for containers defined in the database. Each container node has links to the rules that recite the corresponding container in a field.

Some embodiments start a search for a matching rule with the source or destination address of the incoming packet and use the container-linking search structure to find containers that are linked to the source or destination address. The linked containers are in turn used to find rules that are linked to the linked containers. The use of the container linking search structure also allows container definitions to be dynamically updated or modified during operations of the packet classification system. Some embodiments update the membership of a container by adding or deleting a link to a container from an address node.

Some embodiments use the container-linking search structure to create a list potential matching rules based on addresses and containers. Some embodiments include additional search structures for finding other potential matching rules. In some embodiments, a port-based search structure is used to search for potential matching rules based on source and destination ports. In some embodiments, the port-based search structure includes a search tree for identifying rules that specifies a single discrete value for at least one of its source or destination port field and a link list for identifying rules that specifies a range or collection of ports values by using expressions or relational operators for at least one of its source or destination port field. In some embodiments, a protocol based search structure is used for rules that have wildcards in all fields except the protocol field. Some embodiments then collect the potential matching rules from the various search structures and find a highest priority rule that matches the incoming packet in all fields.

Some embodiments identify one highest priority matching rule from the list of potential matching rules as the one final matching rule for the incoming packet. In some embodiments, each rule in the rules database is associated with a priority number. These priority numbers of the rules in turn serve as the basis for finding the highest priority matching rule. Some embodiments examine the potential matching rules in the list according to the priority numbers of the rules, higher priority rules before lower priority rules. The examining process terminates when a rule that matches the incoming packet in all fields is found. Some embodiments avoid determining whether an IP address belongs to a container during the matching process in order to minimize computation time.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
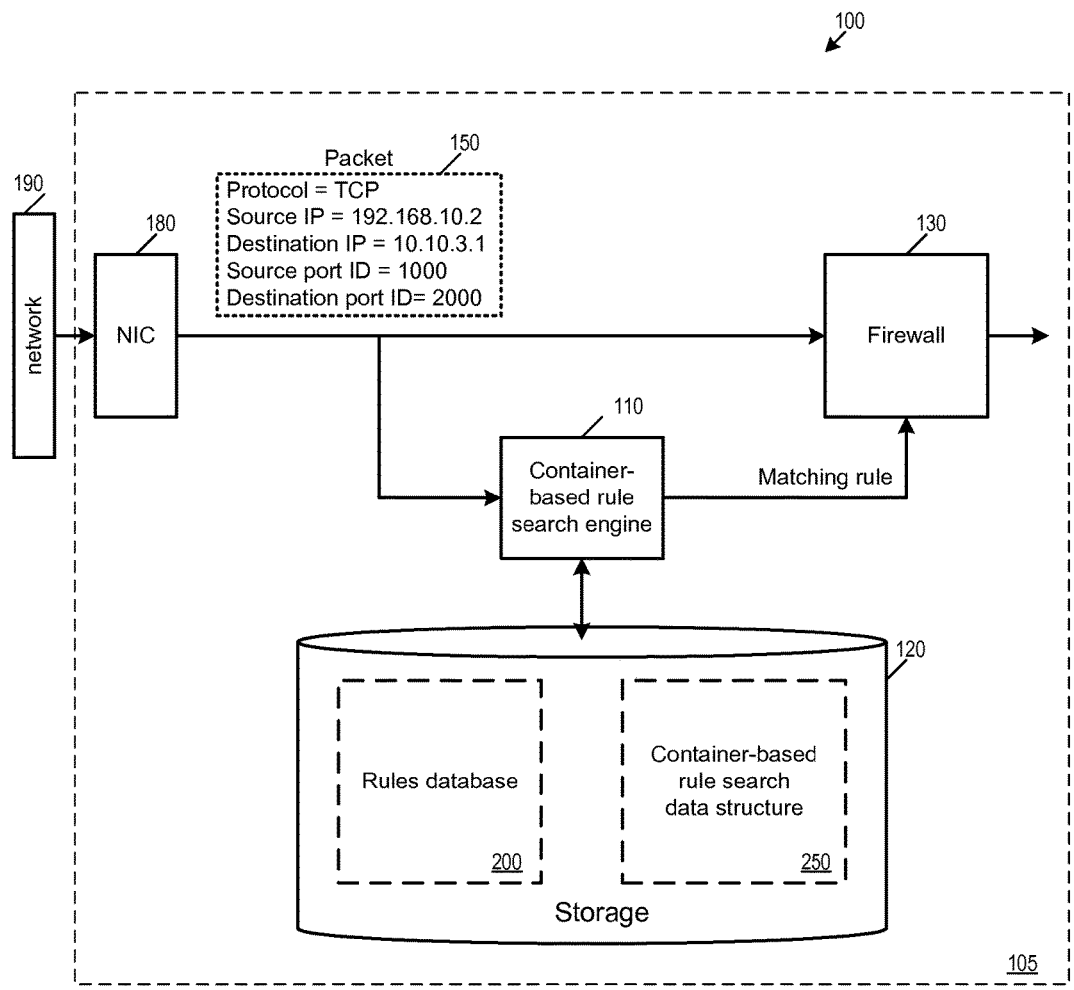
FIG. 1 illustrates a packet classification system which classifies incoming packets according to a set of packet classification rules that uses containers of IP addresses to specify source or destinations.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

To speed up the packet classification for container-based rules, some embodiments of the invention provides a novel algorithm for packet classification that is based on a novel search structure for packet classification rules. In some embodiments, addresses from all the containers are merged and maintained in a single Trie. Duplicate addresses in multiple containers are maintained in a separate list anchored off the Trie, i.e., there is one entry in the Trie and the duplicates are maintained separately. Each entry (in the Trie or the Duplicate list) has additional information that can be traced back to the container from where the address originated. Some embodiments use this information to keep the Trie in sync with the containers when the container definition dynamically changes.

In some embodiments, each entry also has information about all the rules that point at the entry. Each entry also has information on whether it is a source match or destination match or both. In some embodiments, if an address appears in the "source" part of the rule, then it can only be matched as a source address in the packet (and vice versa for address that appear in destination part of the rule.)

Some embodiments maintain a search structure for rule matching based on ports that is separate from the address Trie. Each entry in the port search structure is a port matching criteria. In some embodiments, each port matching criteria can include ranges, lists, or exact matches. Some embodiments also allow ports matching criteria to be defined according relational operators such as EQ (equal), NEQ (not equal), GT (greater than) and LT (less than). In some embodiments, port matching criteria that is defined to a single value (such as defined by a EQ relational operator) is stored in a binary tree for a quick match. All other port matching criteria (ranges, lists, non-EQ relational operators) are maintained separately in a linear list.

Instead of walking the rules in the rule set to look for a potential match for an incoming packet, some embodiments start the search for a matching rule by using the Trie. The packet classification method split the connection identifiers of the incoming packet into four parts—source address, destination address, source port and destination port. The method then looks up the source address in the Trie for a potential "source" match i.e., when there is a rule that points at a container from the source field which in turn contains this address. The method also looks up the destination address in the Trie for a potential "destination" match. When a matching entry is identified from the Trie, the matching entry is added to a list of candidate rules that could be a match for the incoming packet. Some embodiments do not look for an exact match as there could be rules with prefixes that could be a better match. Some embodiments therefore look for all matches and not just the longest prefix match, which is done for routing. In some embodiments, the lookup for potential matches from source address, destination address, and ports can proceed parallel.

Once the list of candidate rules has been established, some embodiments sort the rules in the list based on priority in order to find the highest priority matching rule. The search for a matching rule start from the highest priority (i.e., the lowest priority number) rule in the candidate list until a rule that matches the incoming packet's identifying parameters has been found. When examining a candidate rule for match against the incoming packet, some embodiments avoid looking up a container if the candidate rule can be determined to be the matching rule or not without resolving the container. In some embodiments, if a matching rule cannot be found from the addresses or ports of the packet, the method lookup the wildcard entries indexed by protocol to find a potential match.

Whenever the membership of a container changes, some embodiments update the links between the container and the addresses in the Trie accordingly. This allows minimum churn in the data plane and any subsequent incoming packets automatically match the updated container.

Several more detailed embodiments of the invention are described below. Section I describes the container-based rule matching, including its supporting data structures and its algorithms. Section II describes using multiple searching data structures for creating a list of potential matching rules and to identify a highest priority matching rule. Section III describes an example communications device that implements some embodiments of the invention. Finally, section IV describes an electronic system with which some embodiments of the invention are implemented.

I. Container-Based Rule Matching

FIG. 1 illustrates a packet classification system 100 which classifies incoming packets according to a set of packet classification rules that uses containers of IP (internet protocol) addresses to specify source or destinations. As illustrated, an incoming packet 150 from a network 190 is received by a network interface controller (NIC) 180. The packet 150 belongs to a particular connection session that is identifiable by a set of connection identifying parameters, namely its five-tuple parameters of protocol, source IP address, destination IP address, source port ID, and destination port ID. The connection identifying parameters of the incoming packet 150 is used by a rule search engine 110 to look for a rule that matches the connection identifying parameters from storage 120. The matching rule is provided to a firewall module 130, which decides what action to take with regard to the packet, i.e., to block, to accept, to forward, etc.

In some embodiments, the NIC 180, the rule search engine 110, the storage 120, and the firewall module 130 are implemented by a computing device 105 that is serving as a host machine in a virtualized network environment. In some of these embodiments, the host machine is operating a virtualization software for providing computing resources and network access to a number of virtual machines. The firewall module 130, the rule search engine 110 are software modules of the virtualization software. In some embodiments, the computing device implementing the system 100 also includes a physical NIC or hardware switch, which serves as the interface to the physical network 190. Such hardware switch in some embodiments includes sufficient programmable hardware resources to implement some stateless lookup capabilities to assist in the container-based rule search performed by the rule search engine 110. A computing device for performing some embodiments of the invention will be further described in Section III below.

The storage 120 is for storing a rules database 200 for implementing a firewall, from which the matching rule for the incoming packet 150 is to be found. In some embodiments, the rules database 200 includes container-based rules. In other words, at least some of the rules in the database are defined by using containers of IP addresses (e.g., security groups or IP sets) as sources or destinations. In order to efficiently search for a rule from the rules database 200 in which at least some of the rules are container-based, the rule search engine 110 uses a container-based search structure 250. In some embodiments, within the container-based search structure 250, every IP address from every container has a corresponding entry or node, and every node in turn has links to the containers that its corresponding IP address comes from. The structure 250 also has an entry or node for each container, which has links to rules that are defined by using the container as source or destination. In some embodiments, the container-based search structure is stored in the storage 120 and can be dynamically updated by a network controller or manager.

Figure 2:
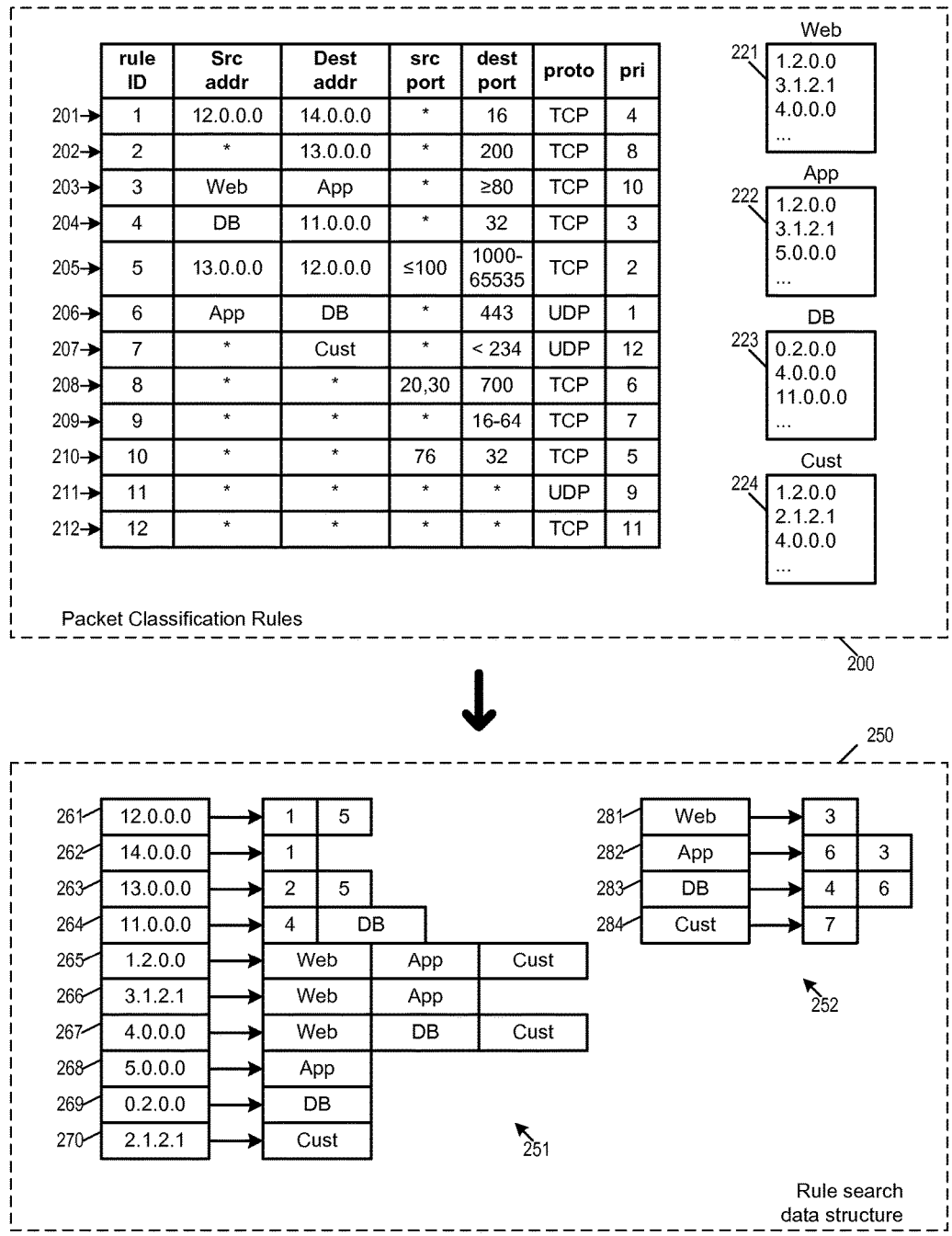
FIG. 2 illustrates a container-linking search structure for container-based rules.

FIG. 2 illustrates a search structure for container-based rules. Specifically, the figure illustrates the search structure 250 for searching rules from the rules database 200. The rules database 200 includes a set of rules 201-212 and a set of container definitions 221-224. Some of the rules (i.e., the rules 203, 204, 206, and 207) use containers to specify source address and/or destination address.

The set of container-based rules 201-212 includes at least 12 rules. Each rule has an identifier (rule ID) and is associated with a priority number. Each rule has five fields: source address, destination address, source port, destination port, and protocol. In some embodiments, these five fields correspond to the connection five-tuple of a connection session. A rule is considered a matching rule for a packet if the packet's identifying parameters (e.g., its connection five-tuple) satisfies all fields of the rule. Wildcards or "don't care" can be used in a field to indicate that any value would satisfy the matching requirement of that field. When identifying a matching rule for a packet, a matching rule with higher priority (e.g., having lower priority number) would override matching rules with lower priority (e.g., having higher priority number) as the final result matching rule to be applied on the incoming packet.

The set of rules in 201-212 is considered to be container-based rules, because some of its rules use containers as source or destination. For example the rule 203 (with rule ID '3') has container "Web" as source and container "App" as destination, while the rule 206 (with rule ID 6) has container "App" as source and container "DB" as destination. Some of the rules in the set of rules 201-212 use explicit addresses as source or destination. For example, the rule 205 has IP address "13.0.0.0" as source and "12.0.0.0" as destination. Some rules use both containers and explicit addresses. For example, the rule 204 has container "DB" as source and IP address "11.0.0.0" as destination.

The container definitions 221-224 includes container definitions for containers "Web", "App", "DB", and "Cust", respectively. Each of these containers is defined to encompass a set of IP addresses. For example, the container 221 is defined to include IP addresses "1.2.0.0", "3.1.2.1", and "4.0.0.0". In some embodiments, the containers are not mutually exclusive. For example the address "1.2.0.0" is included in containers "Web", "App", and "Cust". Further, an IP address can belongs to a container and yet explicitly enumerated by one or more of the rules. For example, the address "11.0.0.0" belongs to the container "DB" and is also explicitly recited by the rule 204.

Since a container is meant to be a collection of IP addresses, a rule that uses a container as source address (or destination address) is a potential match for all incoming packets having source addresses (or destination address) that is defined to be in that container. For example, packets with destination IP addresses "1.2.0.0", "2.1.2.1", "4.0.0.0" are all potential matches for the rule 207, since they are IP addresses included in the container "Cust", and the rule 207 uses "Cust" as its destination address.

The search structure 250 is a container linking data structure that is derived from the content of the rules database 200, i.e., from the rules 201-212 and the container definitions 221-224. As illustrated, the container linking search structure 250 includes a sub-structure 251 for IP addresses and a sub-structure for 252 for containers.

The addresses sub-structure 251 includes 10 entries (or nodes) 261-270, each node corresponds to an IP address that is included in one of the containers 221-224 or explicitly recited by one of the rules 201-212. Every entry in the sub-structure 251 is unique, i.e., no two entries in sub-structure 251 are assigned to a same IP address. Each entry in the sub-structure 251 has links indicating which containers encompass the address of the entry, and which rules explicitly recite the address as source or destination. For example, the entry 264 has links that indicate that the address "11.0.0.0" is explicitly recited by the rule 204 ("rule 4"), and that it is also one of the addresses contained in the container "DB". In embodiments, an entry for an address would not have a link to a rule unless that rule explicitly recites the address in one of its fields (a rule that use a wildcard or a container in a field does not explicitly recites an address in that field). Thus, the entry 268 for the address "5.0.0.0" would not have links to the rules 203 and 206, even though the address "5.0.0.0" belongs to the container "App" (222) and the both rules 203 and 206 uses the container "App" to specify source or destination address.

The containers sub-structure 252 includes container nodes 281-284 for the four containers 221-224 defined in the database 200, i.e., the containers "Web", "App", "DB", and "Cust", respectively. Each container node in the sub-structure 252 has links to the rules that recite the corresponding container in a field (a rule that use only wildcards or explicit addresses in a particular field is not a rule that recites a container in that particular field). For example, the entry 282 for the container "App" has a links to the rule 206 (rule 6) and to the rule 203 (rule 3), since the rule 206 and the rule 203 both use the container "App" to specify a field.

The use of the container-linking search structure 250 eliminates the need for looking up containers when examining rules that use containers as source or destination. A rules search engine such as the engine 110 starts rule searching with the source or destination address of the incoming packet and use the structure 251 to find its linked containers, and in turn uses the linked containers to find the linked rules (or use the structure 251 to find the linked rules that explicitly recites the address.) For example, the engine searching for a matching rule for a packet having "3.1.2.1" as source address would use the sub-structure 251 to find the address node 266, which has links to containers nodes 281 and 282 for containers "Web" and "App". As the container node 281 has a link to the rule 203 and the container node 282 has links to the rules 206 and 203, the engine would follows those links to examine the rules 206 and 203. There is no need to examine a container-based rule repeatedly just because it recites a container that includes many IP addresses.

Figure 3:
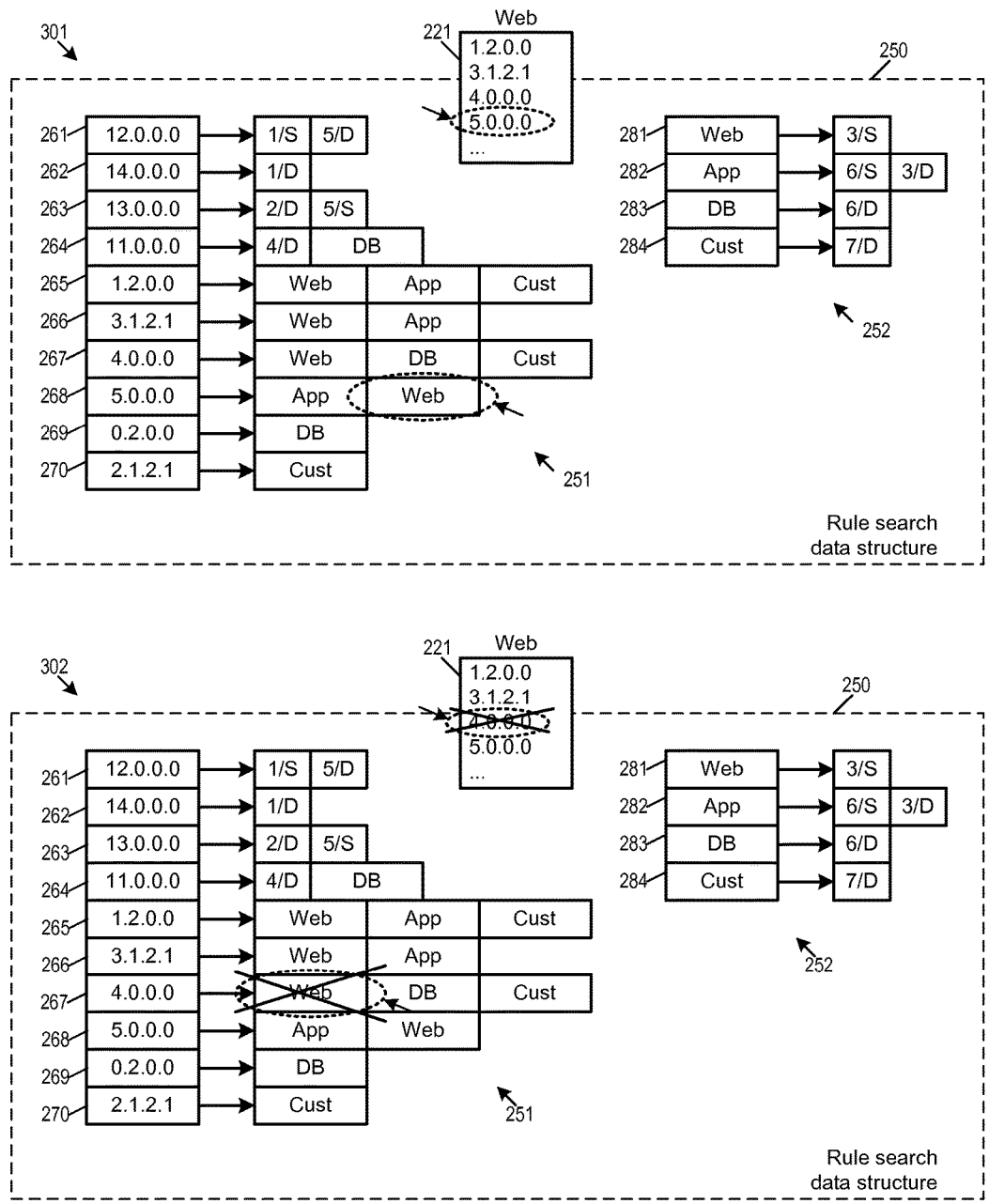
FIG. 3 illustrates dynamic container updating by using the container-linking data structure.

The use of the container linking search structure 250 also allows container definitions to be dynamically updated or modified during operations of the packet classification system without affecting a large swath of rules in the rules database 200. Specifically, membership update of a container due to deletion or addition of an IP address can be accomplished by simply adding or deleting a link to a container from an address entry or node. FIG. 3 illustrates dynamic container updating by using the container-linking data structure 250.

FIG. 3 illustrates two example container updating operations 301 and 302. In the operation 301, the definition (i.e., the membership) of the container "Web" 221 has changed to add a new IP address "5.0.0.0". To implement this update, the address node 268 (the entry that corresponds to the IP address "5.0.0.0") in the address sub-structure 251 adds an additional link to the container "Web" (i.e., the entry 281 in the container sub-structure 252). For some embodiments, this would immediately allow any subsequent rule search operation to use the container "Web" to look for matching rules for packets with IP address "5.0.0.0".

In the operation 302, the definition of the container "Web" has changed to remove an IP address "4.0.0.0". To implement this update, the address node 267 (the entry that corresponds to the IP address "4.0.0.0") in the address sub-structure 251 removes its link to the container "Web" (i.e., the entry 281 in the container sub-structure 252). For some embodiments, this would immediately prevent any subsequent rule search operation from using the container "Web" to look for matching rules for packets with IP address "4.0.0.0".

Figure 5:
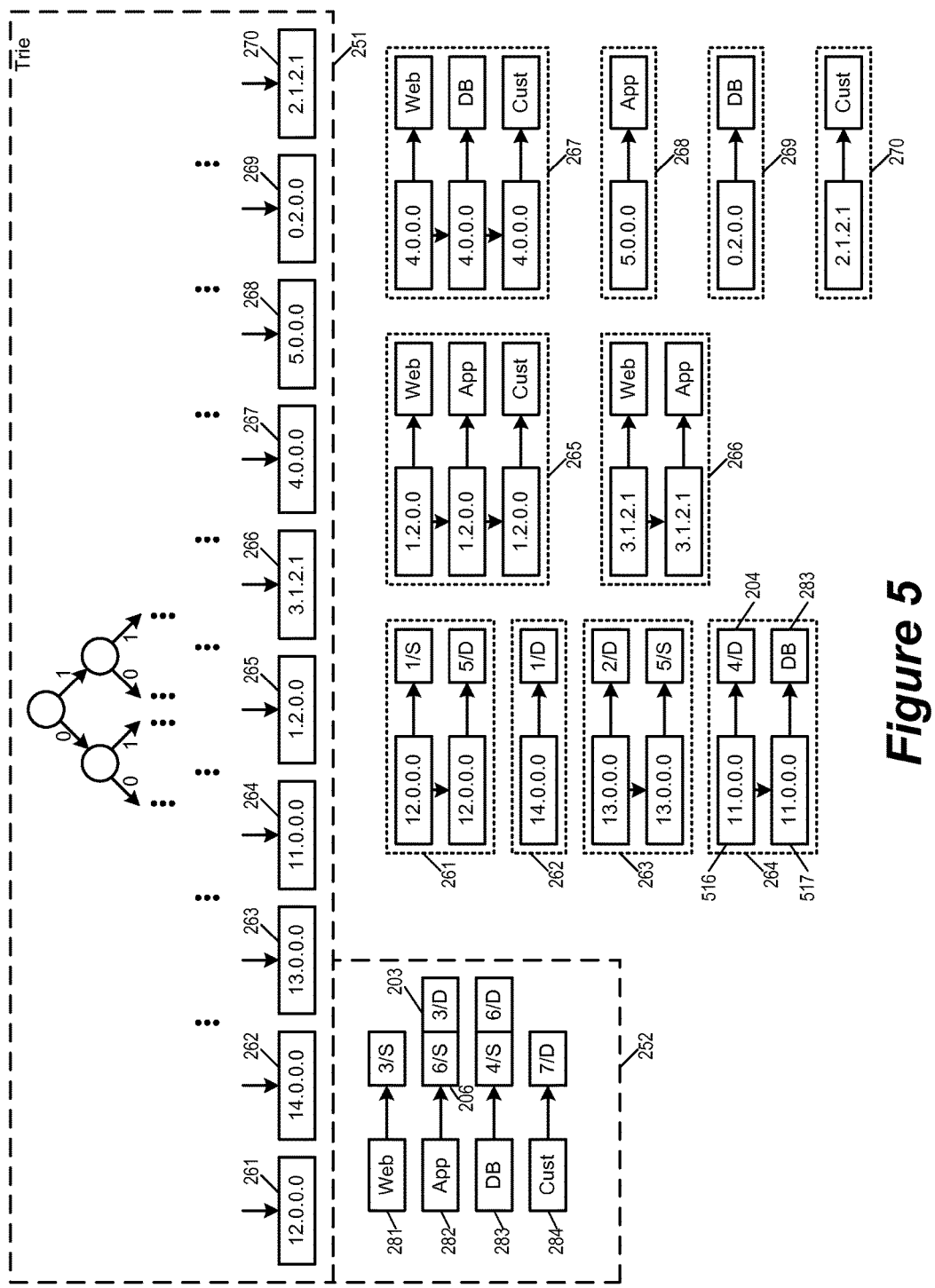
FIG. 5 illustrates a search structure for address-based search and container-based search.

Different embodiments use different types of data structures to implement the substructures 251 and 252. For example, some embodiments use tree structure to implement the address substructure 251. For addresses that points to multiple rules, some embodiments use duplicate nodes linked to a same address node to link to those multiple rules. FIG. 5 below describes a container linking structure that uses a tree structure to link addresses to containers and rules.

II. Multiple Search Structures for Rule Matching

Some embodiments use the container-linking search structure as described by reference to FIGS. 2-3 above to create a list potential matching rules based on addresses and containers. Some embodiments include additional search structures for finding other potential matching rules. In some embodiments, a port-based search structure is used to search for potential matching rules based on source and destination ports. In some embodiments, a protocol based search structure is used for rules that have wildcards in all fields except the protocol field. Some embodiments then collect the potential matching rules from the various search structures and find a highest priority rule that matches the incoming packet in all fields.

Figure 4:
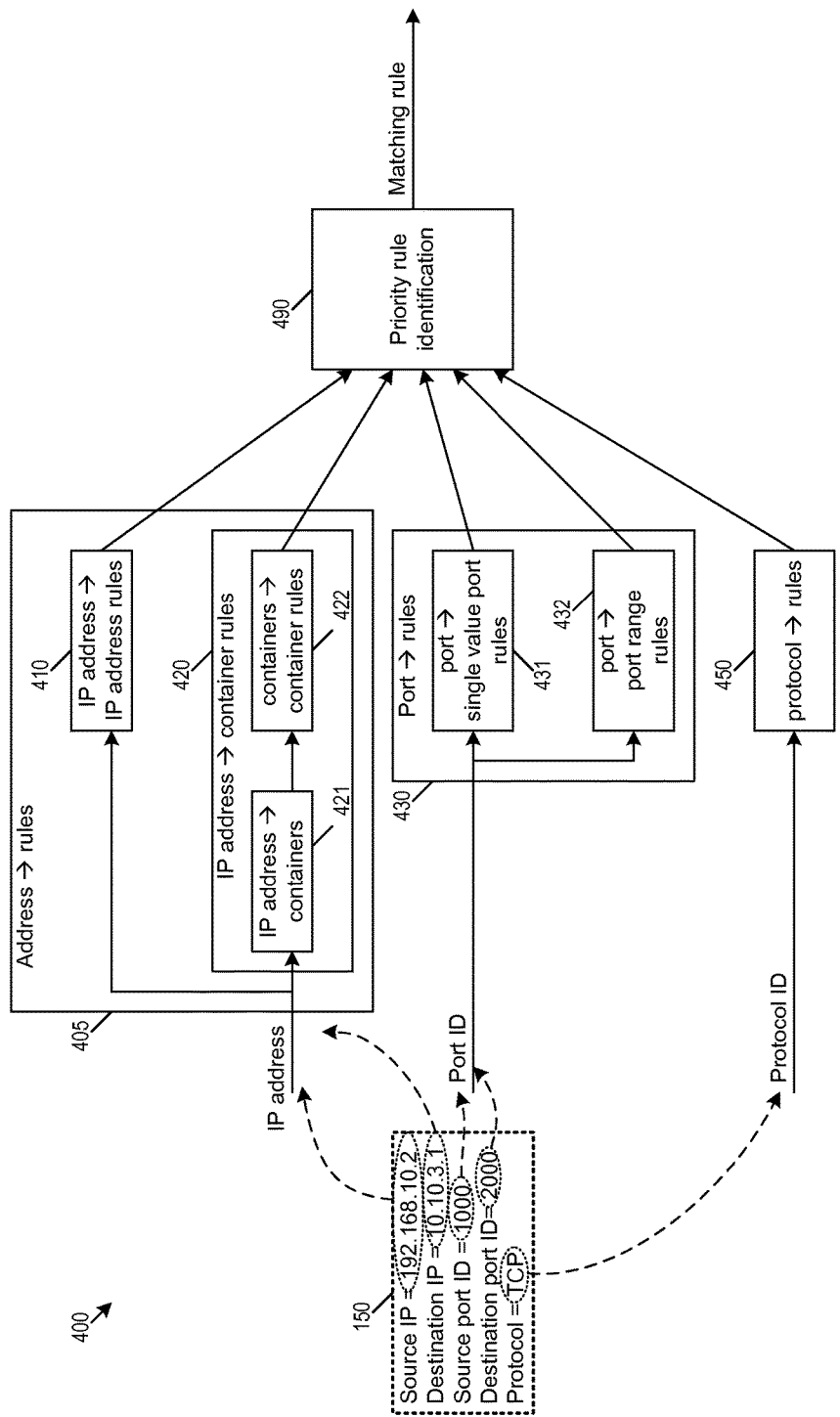
FIG. 4 illustrates a block diagram of a rule search engine that uses multiple data structures to create a list of potential matching rules.

FIG. 4 illustrates a block diagram of a rule search engine 400 that uses multiple data structures to create a list of potential matching rules. The rule search engine 400 includes several searching modules 410, 420, 430, and 450, each searching module being responsible for using one of the identifying parameters (e.g., the connection five-tuple) of the packet 150 to identify one or more potential matching rules from the rules database 200. Each of these searching modules uses a data structure to search the rules database 200 to identify potential matching rules. In some embodiments, one of the data structures used for searching the rules database 200 is a container-linking search structure 250. In some embodiments, the different searching modules can operate in parallel to identify potential matching rules at the same time. The search engine 400 then collects the identified potential matching rules from each of the searching modules and identifies one highest priority rule as the one matching rule for the packet 150.

As illustrated, the searching engine 400 includes an address to rules searching module 410, a container to rules searching module 420, a port to rules searching module 430, a protocol to rules searching module 450, and a priority rule identification module 490. Different rules searching modules use different parameters of the packet 150 to arrive at a collection of potential matching rules for the packet 150. The potential matching rules arrived at by all of the searching modules (410, 420, 430, 440, and 450) are collected by the priority rule identification module 490, which identifies one highest priority rule as the one matching rule for the packet 150.

The address to rules searching module 410 performs address-based search by taking an identifying address (e.g., the source IP address or the destination IP address of the TCP connection) of the incoming packet 150 to come up with a list of rules whose address fields would match the identifying address. In some embodiments, the match is source or destination specific, namely, a rule is considered a potential match if the source IP address of the incoming packet is explicitly recited by the source address field of the rule (or if the destination IP of the incoming packet is explicitly recited by the destination field of the rule).

In some embodiments, the address-based rule search uses a data structure such as the search structure 250 of FIG. 2 to facilitate search. In such a structure, nodes for addresses that are explicitly recited by the rules have links to the rules that expressly recites them. The search structure 250 used in some embodiments for address-based search will be further described below by reference to FIG. 5.

The container to rules search module 420 performs container-based search by taking an identifying address (e.g., the source IP address or the destination IP address of the TCP connection) of the incoming packet 150 to come up with a list of rules whose address fields recites a container that contains the identifying address. In some embodiments, the container rule search module 420 first identifies a container that contains the address then find a rules that recites the identified container as source or destination.

In some embodiments, the match is source or destination specific, namely, a rule is considered a potential match if the source IP address of the incoming packet belongs to a container which is recited by a rule as source address (or if the destination IP address of the incoming packet belongs to a container which is recited by a rule as destination address).

In some embodiments, the container-based rule search uses a data structure to facilitate search, such as the search structure 250 of FIG. 2. In such a structure, an address node for an address that is included in a particular container has a link to the container node of that particular container, and the container node in turn has links to rules that recites the particular container.

In some embodiments, the data structure 250 serves as the data structure that assists in the search of potential matching rules for both address-based and container-based rule search (e.g., as performed by searching modules 410 and 420 of FIG. 4). In some embodiments, address-based rule search and container-based rule search share a same data search structure, because each address in the incoming packet (i.e., source or destination IP address) can either match a rule that directly recites the address or a rule that recites a container that contains the address. To that end, the address substructure 251 serves as a primary or first order mapping of IP address to either containers or rules, while the container substructure 251 serves as a secondary or second order mapping of containers to rules. In some embodiments, a same address to rules search engine 405 performs both the address-based search and the container-based search by using the same data structure 250.

The port to rules searching module 430 performs port-based search by taking an identifying port (e.g., the source port or the destination port of the TCP connection) of the incoming packet 150 to come up with a list of rules whose port fields would match the identifying port. In some embodiments, the match is source or destination specific, namely, a rule is considered a potential match if the source port of the incoming packet is explicitly recited by the source port field of the rule (or if the destination port of the incoming packet is explicitly recited by the destination port field of the rule).

In some embodiments, the port-based rule search uses a data structure to facilitate search. As mentioned, in some embodiments, a rule can have a port field that explicitly specifies a single value, or an expression that defines a range or a collection of ports values. Some embodiments therefore use one search structure for rules having explicit single port values and another for rules having ranges or collections of port values. The data structure for explicit single port values have nodes that each correspond to an explicit single port value, while the data structure for ranges or collections of port values have nodes that each correspond to a range or a collection of port values. A data structure used in some embodiments for port-based search will be further described below by reference to FIG. 7.

The protocol search module 450 perform port-based search by taking the identifying protocol (i.e., the protocol of the connection, UDP, TCP, etc.) of the incoming packet to come up with a list of rules whose protocol matches the identifying protocol. In some embodiments, the protocol search module 450 only searches for rules whose address and port fields are all wildcards. A data structure used in some embodiments for protocol-based search will be further described by reference to FIG. 8 below.

Figure 7:
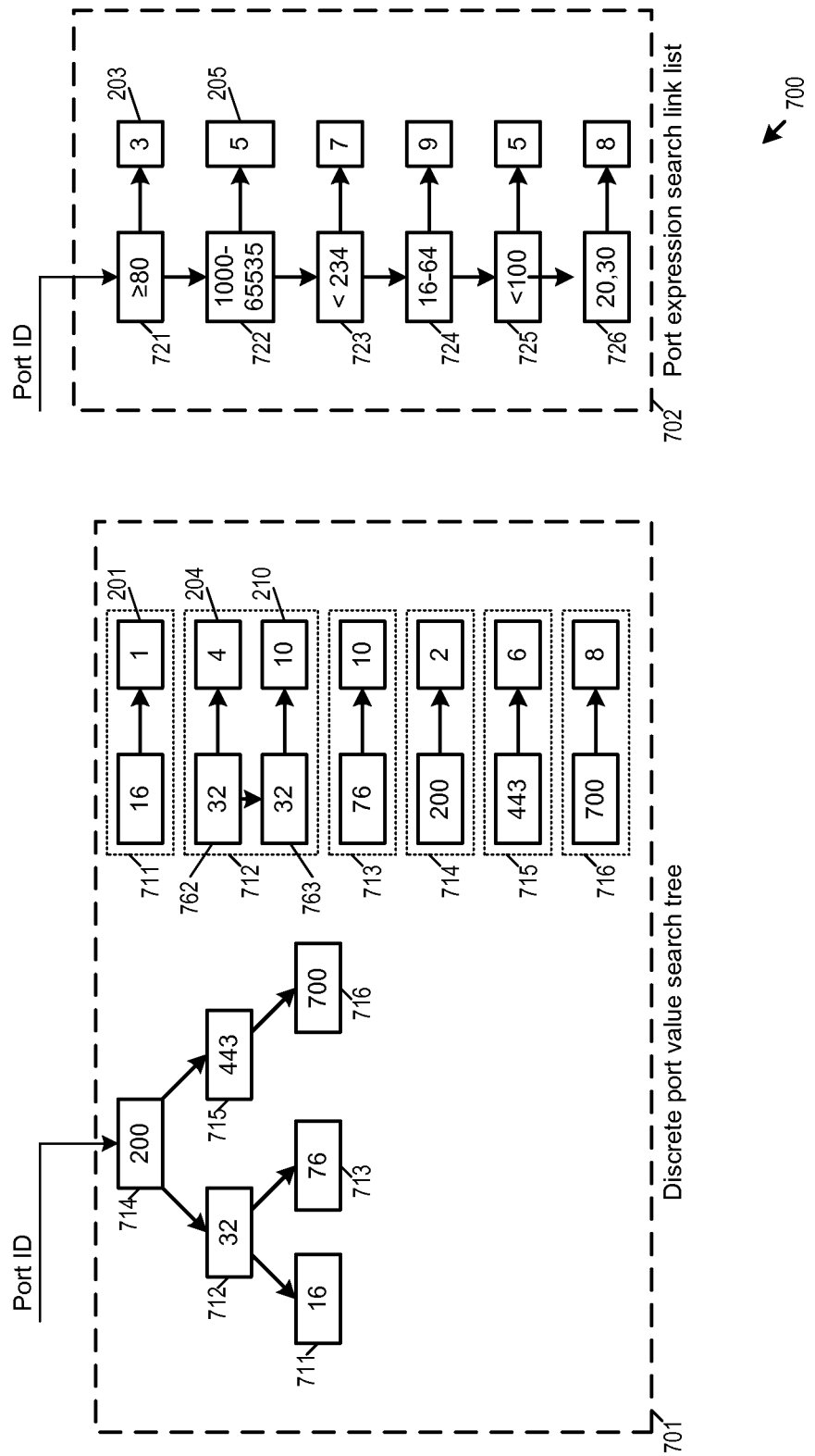
FIG. 7 illustrates a data structure for performing port-based search.
Figure 8:
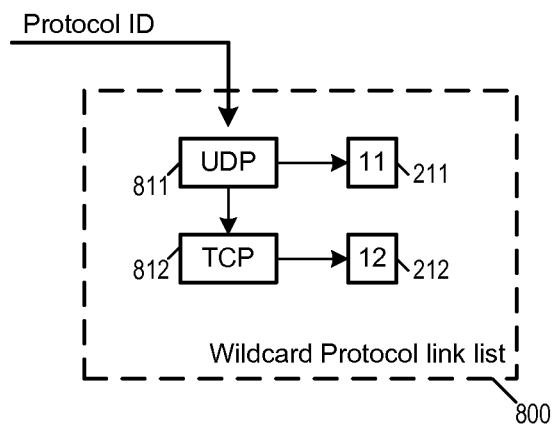
FIG. 8 illustrates a data structure for performing protocol-based rule search.

As mentioned, some embodiments use various search data structures to come up with a list of potential matching rules for the incoming packet. Each search structure uses one of the identifying parameters of the packet to arrive at its corresponding list of potential matching rules. In order to implement a firewall, some embodiments analyze the rules of the firewall (i.e., its rules database) to create the various search structures. FIGS. 5, 7, and 8 illustrate various search structures that are created from the firewall rules database 200.

FIG. 5 illustrates a search structure 500 for address-based search and container-based search in the rules database 200. The data structure 500 is used to identify potential matching rules based on the source and destination IP address of a connection five-tuple of an incoming packet.

For some embodiments, the data structure 500 is an implementation of the container-linking data structure 250. As mentioned, the search structure 250 is a container-linking data structure that is derived from the rules 201-212 and the container definitions 221-224 of the rules database 200. Every address recited by a rule in the database or included in a container has a unique corresponding node in the address substructure 251 as one of the address nodes 261-270. Each address node has links (or markings) indicating which containers encompasses the address of the node, and which rules explicitly recites the address of the node as source or destination. Every container defined in the database has a unique corresponding entry in the containers sub-structure 252 as one of the container nodes 281-284. Each container node in the sub-structure 252 has links indicating which rules use the corresponding container to specify source or destination.

The address nodes 261-270 in the address substructure 251 are organized as search tree. As illustrated in FIG. 5, the address substructure 251 organizes the address nodes 261-270 as a trie or prefix tree, for which addresses serve as keys. In some embodiments, a node in a trie does not store the key associated with that node. Instead, the node's position in the trie defines the key with which it is associated. All the descendants of a node have a common prefix of the string associated with that node, and the root is associated with the empty string. Values are normally not associated with every node, but only associated with leaf nodes and some inner nodes that correspond to keys of interest. In some embodiments, the substructure 251 organizes the address node 261-270 into a binary search tree (not illustrated). In some embodiments, the binary search tree is maintained as an AVL (Adelson-Velskii and Landis) binary search tree based on a hash value of the address in the node. Organizing the address nodes into a search tree (e.g., prefix tree or binary tree) ensures that the search for any address node in the substructure 251 can be done in the order of log(n) steps, n being the number of nodes in the tree.

FIG. 5 also illustrates the structures of each address nodes (261-270) in greater detail. As illustrated, each address node has a pointer to rules that explicit recite the address or to containers that contains the address. In some embodiments, each address node is organized as a linked list with one or more sub-nodes, each sub node having one pointer to either a rule or a container. For example, the address node 264 for the address "11.0.0.0" is a link list with two sub-nodes 516 and 517. The sub-node 516 has a pointer to the rule 204 (i.e., rule 4) and the sub-node 517 has a pointer to the container "DB" (i.e., container node 283). Some embodiments implement each address node as an original node with additional duplicate nodes for pointing to additional containers or rules. For example, for the address node 264, the original node 516 points to the rule 204, while the duplicate node 517 points to the container "DB". In some embodiments, address node do not have sub nodes or duplicate nodes. Instead, each address node has as many pointers as needed to point to all rules that explicitly recite the address and all containers that include the address.

In some embodiments, each pointer to a rule also indicates whether the address is recited by the rule as a source address or destination address. For example, for the address "13.0.0.0" (address node 263), the pointer of the sub-node 514 to the rule 202 is illustrated as "2/D", indicating that the address "13.0.0.0" is recited by the rule 202 as a destination address. On the other hand, the pointer of the sub-node 515 is illustrated as "5/S", indicating that the address "13.0.0.0" is recited by the rule 205 (i.e., rule 5) as a source address. Hence, when identifying potential matching rules for an incoming packet having "13.0.0.0" as destination address, the rule 202 would be included as a potential match but not the rule 205.

The containers sub-structure 252 includes entries (or container nodes) 281-284 for the four containers defined in the database 200, i.e., the containers "Web", "App", "DB", and "Cust", respectively. Each entry or container node in the sub-structure 252 has pointers to the rules that recite the corresponding container of the entry. For example, the container "App" (282) has pointers to rule 206 and 203 as those rules recites "App" as source or destination. Furthermore, in some embodiments, each pointer also indicates whether the container is recited by the pointed rule as a source or destination. For example, for the container "App" (container node 282), the pointer to the rule 206 is illustrated as "6/S", indicating that the container "App" is recited by the rule 206 as a source address. On the other hand, the pointer to the rule 203 is illustrated as "3/D", indicating that the container "App" is recited by the rule 203 as destination address. Hence, when coming up with a list of potential matching rules for an incoming packet having "5.0.0.0" as destination address (which belongs to container "App"), the rule 203 would be included as a potential match but not the rule 206.

Figure 6:
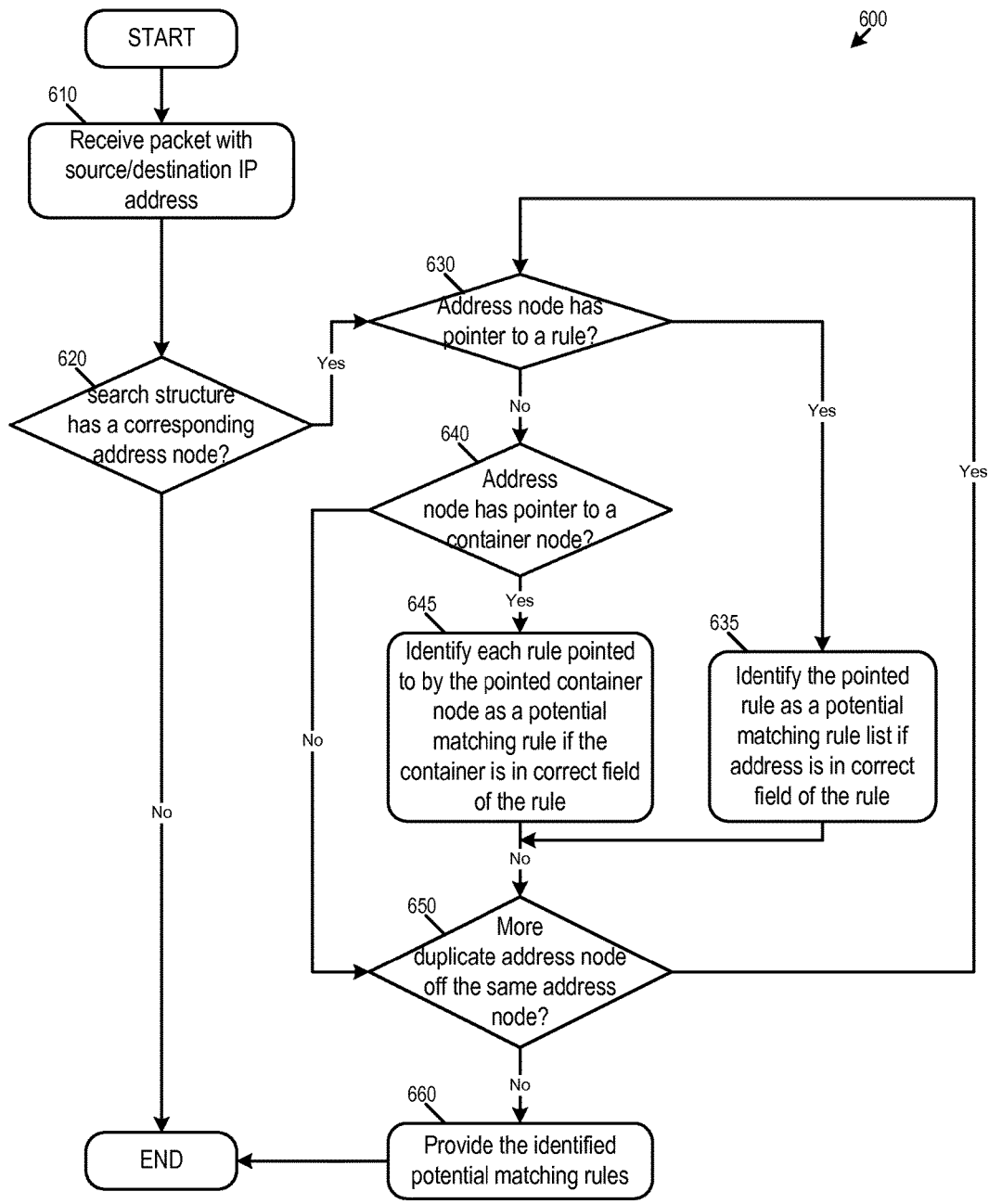
FIG. 6 conceptually illustrates a process for using a container-linking data structure to generate a list of potential matching rules for an address of an incoming packet.

FIG. 6 conceptually illustrates a process 600 for using a container-linking data structure (such as 500) to generate a list of potential matching rules for an address of an incoming packet. For an incoming packet with a source address and a destination address, some embodiments perform the process once for the source address and once for the destination address.

The process starts when it receives (at 610) an incoming packet, which has source and destination IP addresses. The process then determines (at 620) whether the container linking search structure has a corresponding address node for the source or destination IP address of the incoming packet. In some embodiments, the address nodes of the container linking data structure are organized into a sub-structure such as a prefix tree (trie) or a binary tree, and the process uses the address from the incoming packet as a key or hash to traverse the substructure to find the corresponding address node. If the container linking data structure has no node that correspond to the source or destination address of the incoming packet, the process 600 ends without providing a potential matching rule for the incoming packet. If the process is able to find a corresponding address node in the container-linking data structure, the process proceeds to 630.

At 630, the process determines if the address node has a pointer or a link to a rule that explicitly recites the address. If so, the process proceeds to 635. If the address does not have a pointer to a rule that explicitly recites the address, the process proceeds to 640.

At 635, the process identifies the rule pointed to by the address node as a potential matching rule if the rule recites the address in the correct field (e.g., if the address is a source address, the rule will be identified as a potential matching rule only if the rule recites the address in its source address fields). The process then proceeds to 650.

At 640, the process determines if the address node has a pointer or a link to a container node for a container that includes the address node. If so the process proceeds to 645. Otherwise, the process proceeds to 650.

At 645, the process identifies each rule pointed to by the container node as a potential matching rule if the pointed rule recites the container in the correct field. For example, the address node 268 points to the container node 282 (because the address "5.0.0.0" belongs to container "App"), and the container node 282 in turn points to rules 206 and 203. Since the container "App" is used as a source by the rule 206 and as a destination by the rule 203, only the rule 206 would be added to the list of potential matching rules if the incoming packet uses "5.0.0.0" as source address. After identifying potential matching rules for the container, the process proceeds to 650.

At 650, the process determines if there are additional duplicate nodes for the address node. As mentioned, in some embodiments, each address node has only one pointer to either one rule or one container. Additional pointers to additional rules or containers require additional duplicate nodes or sub-nodes in some of those embodiments. Some embodiments do not implement duplicate nodes or sub-nodes for the address node, but instead allow as many pointers from the same address node as needed for pointing to rules and container nodes that includes the address. If there are other duplicate nodes, sub-nodes, or pointers for the address node, the process returns to 630 to examine those other pointers or duplicate nodes. Otherwise, the process proceeds to 660.

At 660, the process has completed identifying potential matching rules for the incoming packet by using the container-linking data structure. The process 600 thus provides the identified potential matching rules. Some embodiments then adds provided potential matching rules to a list of potential matching rules for identifying the highest priority matching rule for the incoming packet (e.g., by the priority rule identification module 490). The process 600 then ends.

FIG. 7 illustrates a data structure 700 for performing port-based search in the rules database 200. The data structure 700 is used to provide a list of potential matching rules based on the source and destination ports of a connection five-tuple of an incoming packet. As illustrated, the data structure 700 includes two substructures 701 and 702. The substructure 701 is a search structure for rules that specifies a single discrete value for at least one of its source or destination port field. The substructure 702 is a search structure for rules that specifies a range or collection of ports values by using expressions or relational operators for at least one of its source or destination port field.

The substructure 701 is a discrete port value search structure that includes discrete value nodes 711-716. Each node of the search structure 701 corresponds to a single, discrete value that was specified by at least one of the rules in the database 200. Each node of the search structure in turn has pointers (or is linked) to the rules that recite the port value represented by the node. For example, both the rules 204 and 210 have the value "32" as its destination port. Consequently, the node 712 for the single port value "32" has pointers to both rules 204 and 210.

In some embodiments, each node of the discrete port value search structure 701 includes sub-nodes or duplicate nodes for when there are multiple rules that recite the same discrete port value of the node. In some embodiments, each discrete value node has one pointer to one rule while each additional pointer to an additional rule is attached to an additional duplicate node of the node. In some embodiments, each node has one or more sub-nodes that each has a pointer to a different rule. For example, the discrete value node 712 has two sub nodes 762 and 763 (or an original node and a duplicate node). The sub node 762 has one pointer to the rule 204, while the sub node 763 has one pointer to the rule 210.

As illustrated, the search structure 701 is a binary search tree having the discrete value nodes 711-716. In some embodiments, the binary search tree is maintained as an AVL (Adelson-Velskii and Landis) binary search tree based on a hash value of the address in the node. This ensures that the search for any discrete value node in the search structure 701 can be done in the order of log(n) steps, n being the number of nodes in the binary tree. The binary tree 701 is indexed by the hash of the discrete port values in some embodiments.

The substructure 702 is a port expression search structure that includes expression nodes 721-726. Each expression node in the link list 702 corresponds to an expression for a range or a collection of port values that are recited by at least one of the rules in the database in its source or destination port fields. For example the node 722 corresponds to the range expression "1000-65535" in destination port of the rule 205, and the node 721 corresponds to the range expression "≥80" in destination port of rule 203. Such expression can include many different types of relational operators, including EQ (equal), NEQ (not equal), GT (greater than) and LT (less than). In some embodiments, such expressions can also include notations for a range values or list of values. As illustrated, the search structure 702 organizes the expression nodes 721-726 into a link list.

In some embodiments, any expression in a source or destination port field of a rule that yields more than one allowable port IDs will have a corresponding node in a port expression search structure such as 702, while any expression that leads to only one allowable port ID will have a corresponding node in a discrete port value search structure such as 701 for a quicker search and match.

FIG. 8 illustrates a data structure 800 for performing protocol-based rule search in the rules database 200. The data structure 800 is used to provide a list of potential matching rules based on the protocol of a connection five-tuple of an incoming packet. As mentioned, in some embodiments, the protocol-based rule search is only for rules that have only protocol field specified, i.e., wildcards are used to specified its address fields and port fields. The rules database 200 has two such rules, namely, the rule 211 and the rule 212. The address fields and port fields of the rules 211 and 212 are all wildcards. However, the rule 211 (rule 11) specifies its protocol to be "UDP", while the rule 212 (rule 12) specifies its protocol to be "TCP". Consequently, the data structure for protocol-based rule search has only protocol nodes 811 and 812 that respectively correspond to "UDP" and "TCP".

Figure 9:
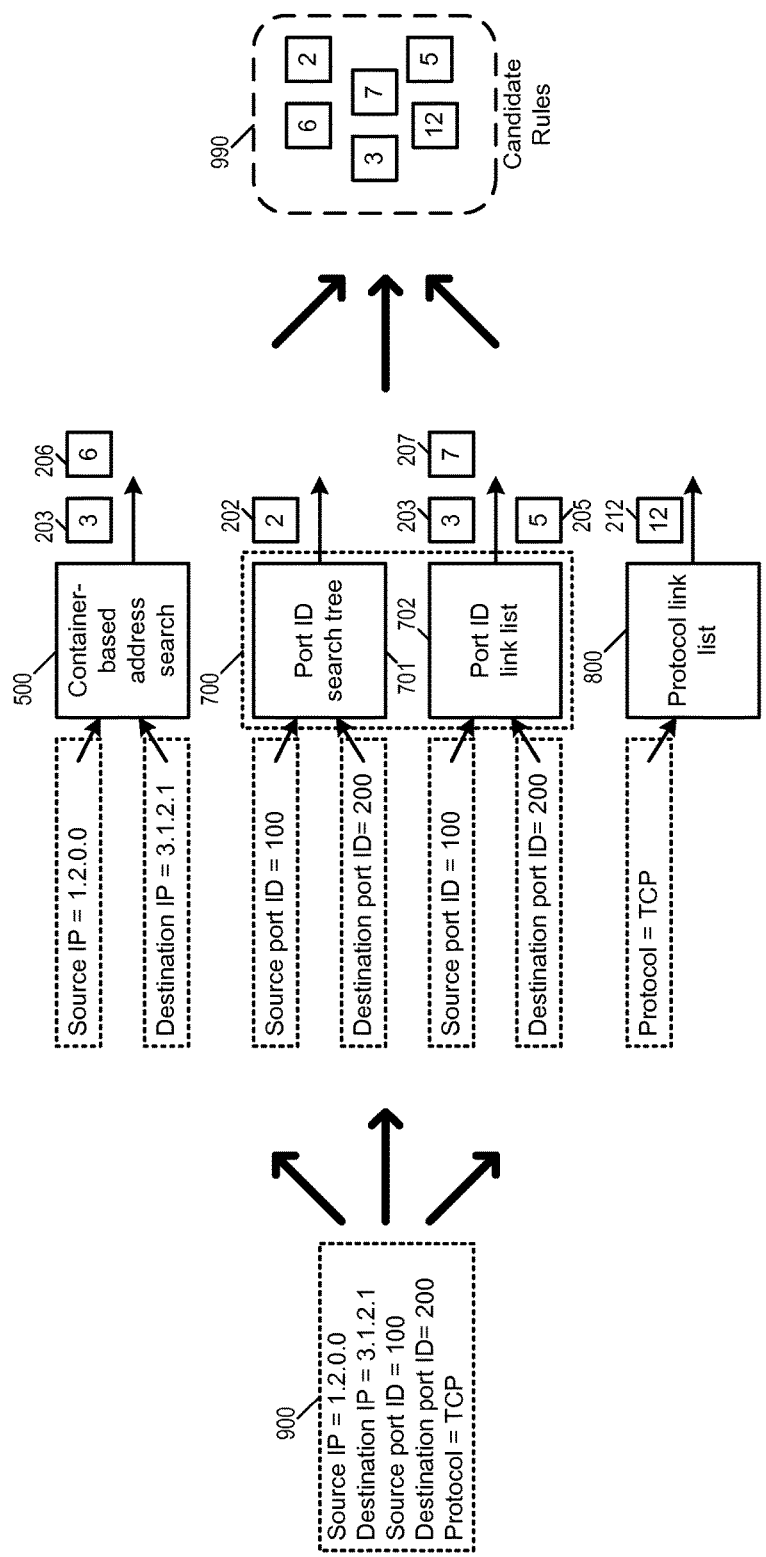
FIG. 9 illustrates the generation of a list of potential matches for a packet by using an address-based search structure, a port-based search structure, and a protocol-based search structure.

As mentioned, the rule search engine 400 uses the various search structures to create a list potential matching rules. Each search structure, when used, produces potential matches that are added to the list. FIG. 9 illustrates the generation of a list of potential matches (or candidate rules) 990 for a packet 900 by using the address-based search structure 500, the port-based search structure 700, and the protocol-based search structure 800. The packet 900 is identifiable by its five tuple connection parameters of source IP address ("1.2.0.0"), destination IP address ("3.1.2.1"), source port ID ("100"), destination ID ("200"), and protocol ("TCP").

The address-based search structure 500 (i.e., the container linking search structure 250) produces potential matching rules based on the source and destination IP addresses of the packet 900 ("1.2.0.0" and "3.1.2.1"). The port-based search structure 700 (i.e., discrete port value search tree 701 and port expression search link list 702) produces potential matching rules based on the source and destination port ID of the packet 900 ("100" and "200"). The protocol-based search structure 800 produces potential matching rules based on the protocol of the packet 900 ("TCP"). As illustrated, the address-based search structure 500 produces rules 3 and 6 (203 and 206) as potential matching rules. The discrete port value search tree 701 produces rule 2 (202) as potential matching rules. The port expression search link list 702 produces rules 3, 5, and 7 (203, 205, and 207) as potential matching rules. The protocol link list produces rule 12 (212) as a potential matching rule. The rules 2, 3, 5, 6, 7, and 12 are thus determined to be the candidate rules or potential matching rules for the incoming packet 900.

In some embodiments, some search structures are used twice for each incoming packet, once for finding potential matching rules based on a source field and once for finding potential matching rules based on a destination field. The matching is thus field specific, e.g., a rule is a potential match for an incoming packet based on its source IP address only if the source address field of the rule explicitly recites the source IP address or recites a container that includes the source IP address in its source address field (likewise for destination address, source port and destination port.

Figure 10:
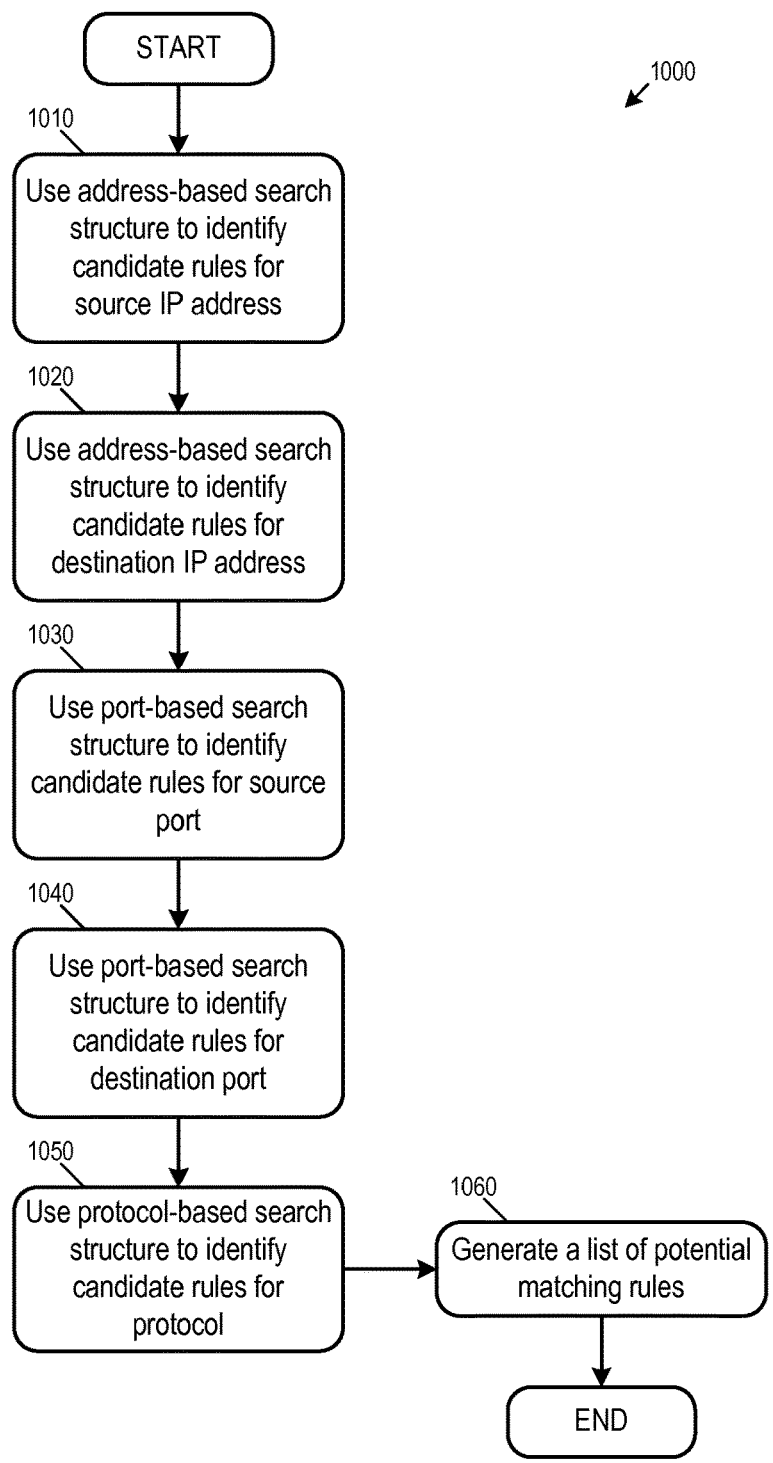
FIG. 10 conceptually illustrates a process for generating a list of potential matching rules for an incoming packet.

For some embodiments, FIG. 10 conceptually illustrates a process 1000 for generating a list of potential matching rules for an incoming packet. The process 1000 applies the various search structures to find potential matching rules based on different identifying parameters of the incoming packet. In some embodiments, the process is performed by the rule search engine 400 of FIG. 4 when it applies the various search structures to come up with a list of potential matching rules. The process 1000 will be described by reference to FIG. 9.

The process 1000 starts when it receives an incoming packet with its five tuple connection identifiers. The process then uses (at 1010) the address-based search structure (e.g., the container linking data structure 500) to find candidate rules for the source IP address. In some embodiments, the process performs this operation by performing the process 600 of FIG. 6 in order to find potential matching rules that either explicitly recites the source address or a container that includes the source address in its source address field. For the example incoming packet 900, both rules 3 and 6 are potential matches for its source IP address of "1.2.0.0". This is because the IP address "1.2.0.0" is a member of the container "Web" and the container "App", which are recited as source addresses by both rules 3 and 6.

The process next uses (at 1020) the address-based search structure (e.g., the container linking data structure 500) to find candidate rules for the destination IP address. In some embodiments, the process performs this operation by performing the process 600 of FIG. 6 in order to find potential matching rules that either explicitly recites the destination address or a container that includes the destination address in its destination address field. For the example incoming packet 900, the rule 3 is a potential match for its destination IP address of "3.1.2.1". This is because the IP address "3.1.2.1" is a member of the container "App", which is recited as destination address by rules 3.

Next, the process uses (at 1030) the port-based searching structures to find candidate rules for the source port. In some embodiments, the process uses one structure for searching for rules that use discrete values to specify ports (e.g., by using the discrete port value search tree 701) and another structure to search for rules that uses expression to specify a range or collection of port values (e.g., by using the port expression search link list 702). For the example incoming packet 900, the port expression search link list 702 yields rule 5 as a potential match, because it recites a range of port values ("≤100") in the source port field that includes the source port value of "100".

Next, the process uses (at 1040) the port-based searching structures to find candidate rules for the destination port. For the example incoming packet 900 having "200" as destination port, the use of the port expression search link list 702 yields rules 3 and 7 as potential matching rules, because rule 3 recites destination port in range of "≥80", while rule 7 recites destination port in range of "<234". On the other hand, the use of the discrete port value search tree 701 yields rule 2 as potential matching rules because the rule 202 explicitly recites "200" as its destination port.

Next, the process uses (at 1050) the protocol-based searching structure to find candidate rules for the protocol. As mentioned, in some embodiments, only rules with wildcards in all fields except protocol (i.e., protocol-only rules) are considered for this search. In rules database 200, that leaves only rules 11 ("UDP") and 12 ("TCP"). Since the protocol of the incoming packet is "TCP", only rule 12 (212) is a potential matching rule.

Finally, the process generates (at 1060) a list of potential matching rules by collecting all potential matches that are identified by using the various searching data structures. In the example of FIG. 9, the rules 2, 3, 5, 6, 7, 12 are identified as the potential matching rules for the incoming packet 900 and thus added to the list 990. In some embodiments, each rule is only represented once in the list of potential matching rules regardless of how many different data structures found the rule to be a potential match. In some embodiments, the potential matching rules are sorted according to their priority number as they are added to the list of potential matching rules. The list the potential rules is then used to identify the matching rule for the incoming packet. After generating the list of potential matching rules, the process 1000 ends.

Though process 1000 is illustrates as a series of sequential operations, the operations 1010, 1020, 1030, 1040, and 1050 are not necessarily performed in the order as shown in FIG. 10. Furthermore, some embodiments perform at least some of the operations 1010, 1020, 1030, 1040, and 1050 in parallel by different hardware or software components. In some embodiments, the operations 1010 and 1020 are performed by a same address to rules search engine (e.g., 405) in different iterations (once for source address once for destination address), while the operations 1030 and 1040 are performed by a same port to rules search engine (e.g., 430) in different iterations (once for source port once for destination port).

Once the rules searching process (or engine) has used the various search structures to come up with a list of potential matching rules for the incoming packet, some embodiments then proceeds to identify one final matching rule to be applied to the incoming packet. Unlike the search for potential matching rules in which a rule is considered a potential match as long as one of its fields is satisfied by the incoming packet, the search for the one final matching rule requires all fields of a rule to be satisfied by the incoming packet. Some embodiments therefore examine the list of potential matching rules for rules that have all fields satisfied by the incoming packet.

However, in some embodiments, there can be more than one rule that have all fields satisfied by the incoming packet. Some embodiments therefore identify one highest priority matching rule from the list of potential matching rules as the one final matching rule for the incoming packet. In some embodiments, each rule in the rules database is associated with a priority number. These priority numbers of the rules in turn serve as the basis for finding the highest priority matching rule. Some embodiments therefore examine the potential matching rules in the list according to the priority numbers of the rules, higher priority rules before lower priority rules. The examining process terminates when a rule that matches the incoming packet in all fields is found.

Figure 11:
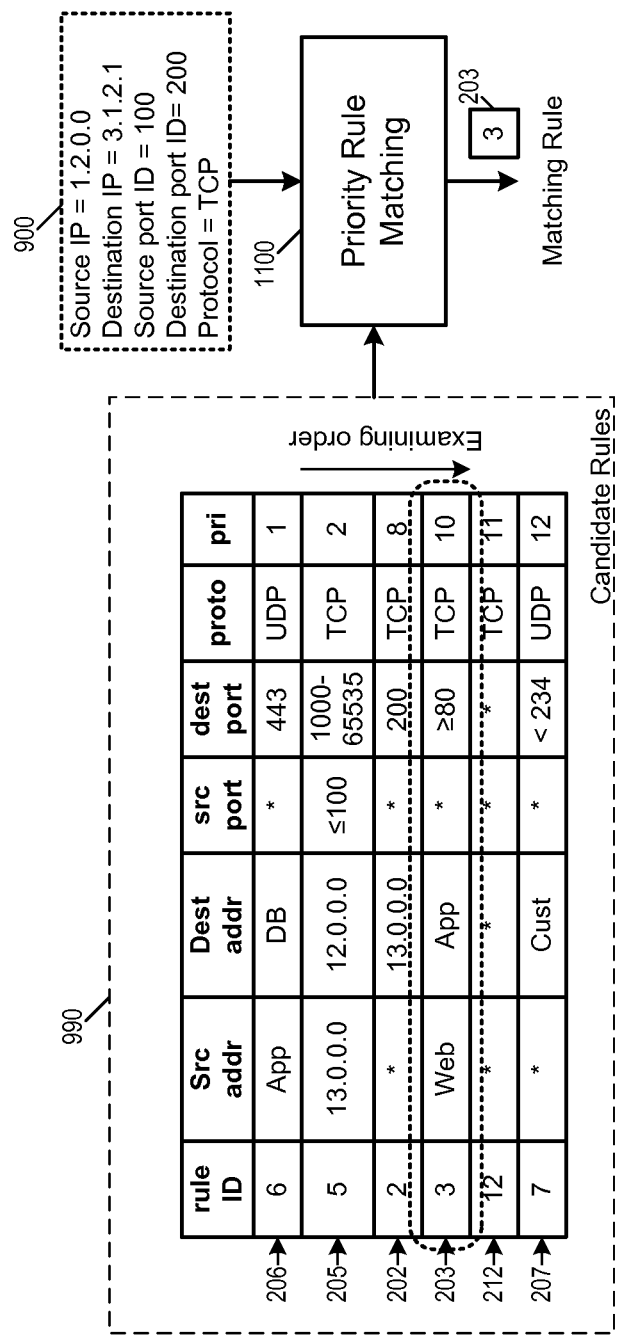
FIG. 11 illustrates using priority numbers of rules to identify the one final matching rule for the incoming packet from the list of potential matching rules.

FIG. 11 illustrates using priority numbers of rules to identify the one final matching rule for the incoming packet 900 from the list of potential matching rules 990. As discussed above, the rules in the list of potential matching rules 990 are identified by various search data structures from the rules database 200, and each rule in the rules database is associated with a priority number. In this example, the smaller or lower priority number represents the higher priority. One of ordinary skill would understand this convention is arbitrarily chosen for illustrative purpose only. Higher priority numbers can be used to signify higher priority rules in some embodiments.

As illustrated, the list of potential matching rules 990 includes rules 2, 3, 5, 6, 7, 12 (rules 202, 203, 205, 206, 207, and 212), which are respectively associated with priority numbers 8, 10, 2, 1, 12, and 11. A priority rule matching module 1100 examines each rule from the list of potential matching rules 990 against the incoming packet 900. The rules in the list are examined according to the order established by priority numbers of the rules. In other words, the list of potential rules are examined in the order of rules 6, 5, 2, 3, 12, and 7, which are respectively associated with priority numbers 1, 2, 8, 10, 11, and 12. The priority rule matching module examines each rule by matching every field of the rule against the incoming packet.

In some embodiments, the priority rule matching module 1100 stops examining rules in the list 990 as soon as a rule that matches the incoming packet 900 in every field is found. In the example of FIG. 11, rules 6, 5, and 2 (206, 205, and 202) were examined and determined not to be the matching rules for the packet 900, while rule 3 (203) is determined to be a matching rule for the packet 900. Rule 3 is identified to be the one matching rule for the packet 900 because it is the highest priority rule that matches the incoming packet. The remaining rules (212 and 207) are not be examined because they are lower priority rules and because the priority rule matching module 1100 stops examining rules as soon as the highest priority matching rule (203) is found.

Figure 12:
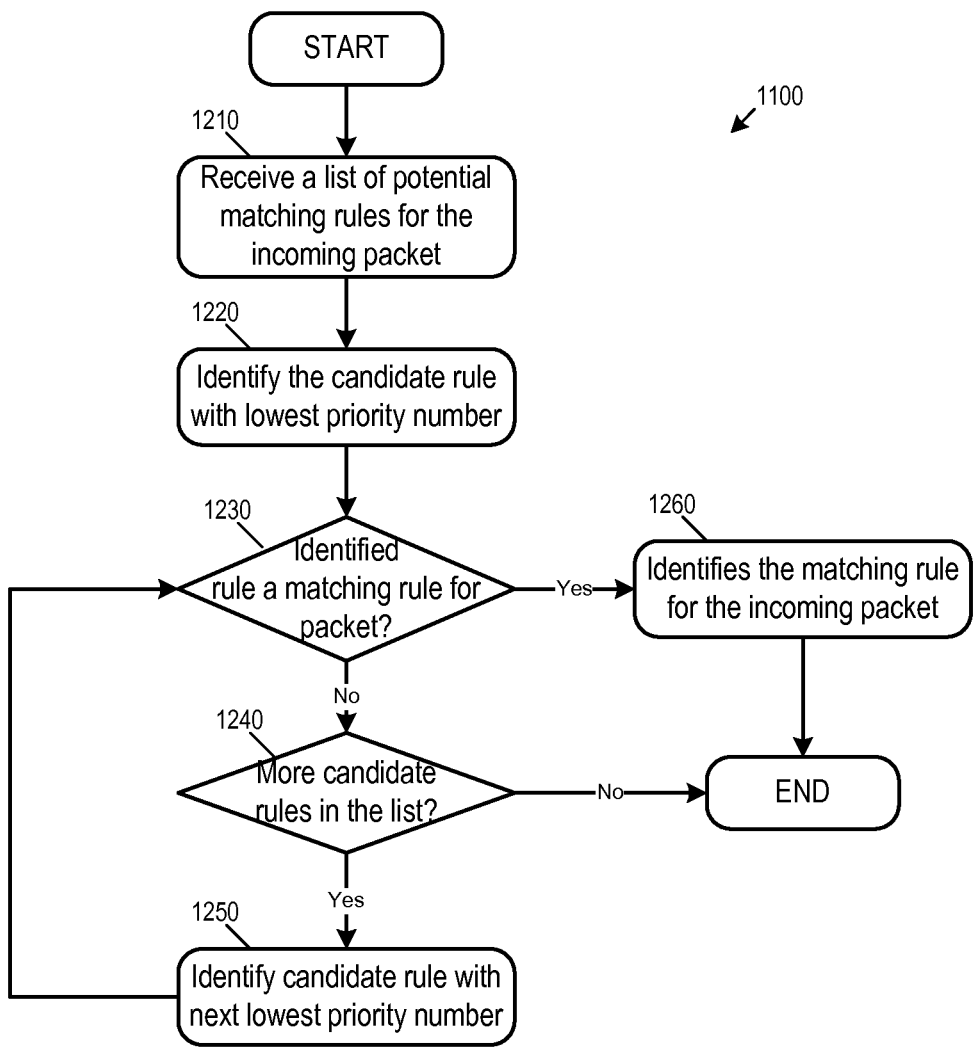
FIG. 12 conceptually illustrates a process for identifying the matching rule for an incoming packet from a list of potential matching rules.

FIG. 12 conceptually illustrates a process 1200 for identifying the one matching rule for an incoming packet from a list of potential matching rules. The process 1200 starts when it receives (at 1210) the list of potential matching rules for the incoming packet. The process then identifies (at 1220) the potential matching rule with the lowest priority number (i.e., the rule with the highest priority) in the list of potential matching rules. Some embodiments sort the list of potential matching rules according to priority numbers so the first rule in the sorted list would be the rule with the lowest priority number. In some embodiments, the potential matching rules in the list are already sorted (e.g., during operation 1060).

Figure 13:
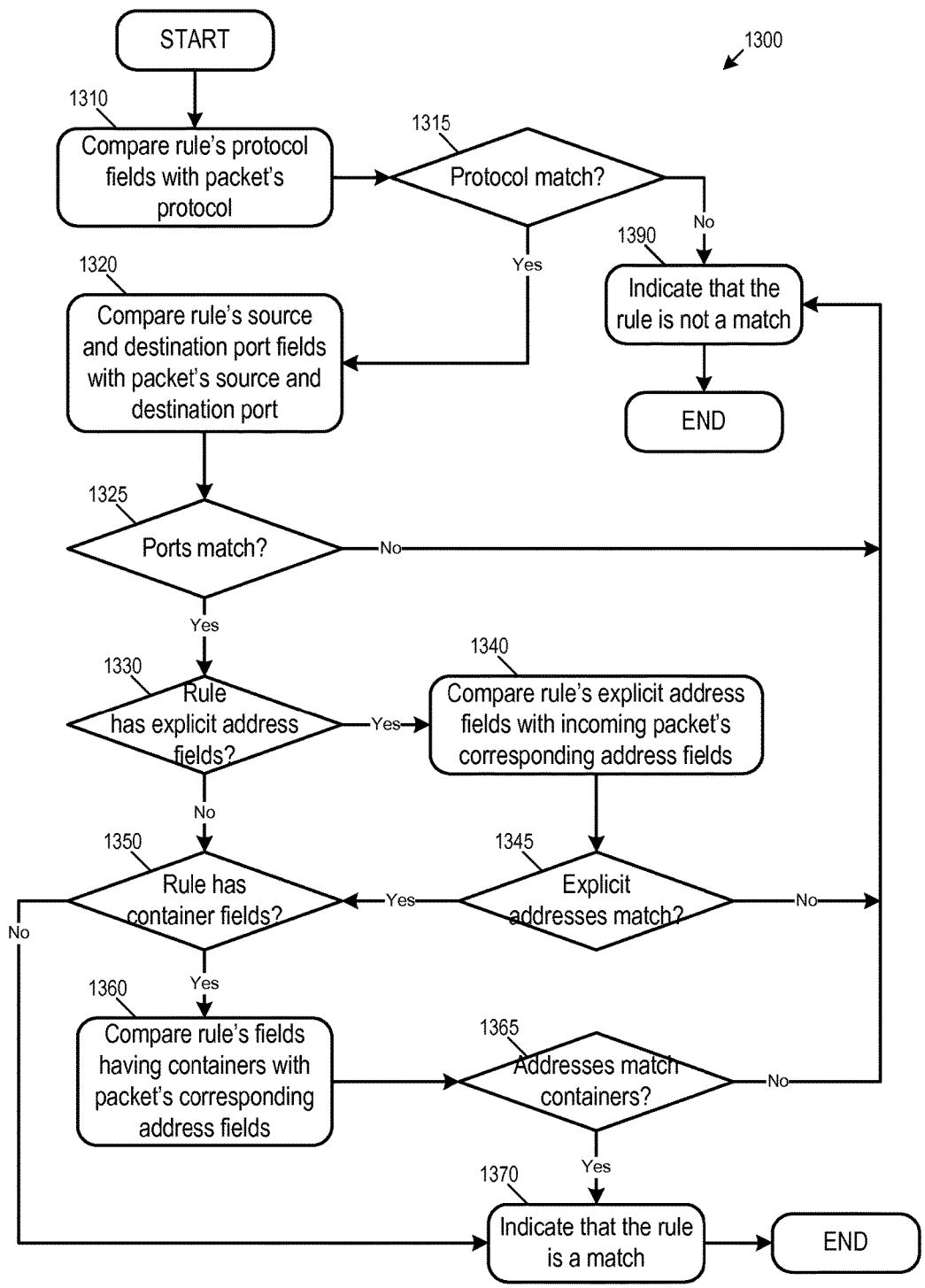
FIG. 13 conceptually illustrates a process for determining whether a rule is a match for an incoming packet.

The process then determines (at 1230) if the identified highest priority rule (the rule with lowest priority number in the list) is a match for the incoming packet. As mentioned, a potential matching rule is a matching rule only if all of its fields match that of the incoming packet. FIG. 13 below describes a process for determining whether a rule is a matching rule for an incoming packet. If the identified highest priority rule is a matching rule for the incoming packet, the process proceeds to 1260. If not, the process proceeds to 1240.

At 1240, the process determines if there are other potential matching rules in the list. If there is no other potential matching rule in the list, the process 1200 ends without identifying the matching rule for the incoming packet. If there is at least one more potential matching rule yet to be examined in the list, the process proceeds to 1250 to identify the potential matching rule in the list with the next lowest priority number (or the next highest priority). The process then returns to 1230 to determine if the identified potential matching rule actually matches the incoming packet.

At 1260, the process has already identifies one rule that matches the incoming packet. Since the list of potential rule is sorted (or is at least examined according to priority numbers), the remaining rules are necessarily lower priority rules that, even if one of them matches the incoming packet, would not be selected as the one matching rule for the incoming packet. The process therefore outputs the identified matching rule as the one matching rule that is to be applied to the incoming packet. The process 1200 then ends.

For some embodiments, FIG. 13 conceptually illustrates a process 1300 for determining whether a rule (e.g., a potential matching rule) is a match for an incoming packet. A rule is a matching rule for the incoming packet if all of its fields (i.e., source/destination addresses, source/destination ports, and protocol) is consistent with or is satisfied by the incoming packet. A wildcard in a field of a rule means that field is a "don't care" during rule matching, i.e., any incoming packet would satisfy or is consistent with that field.

In some embodiments, if possible, the process 1300 avoids determining whether an IP address belongs to a container during the matching process in order to minimize computation time. In some embodiments, the process 1300 is performed during operation 1230 of the process 1200. The process 1300 will be described by reference to the example of FIG. 11.

The process 1300 starts when it receives a rule for examination ("the rule" or the "the rule being examined". The process compares (at 1310) the rule's protocol field with the packet's protocol. In the example of FIG. 11, the protocol field of the rule 206 (rule 6) specifies "UDP", while the protocol field of the incoming packet is "TCP". Rule 6 therefore cannot be a matching rule for the incoming packet. Conversely, the protocol of rules 5, 2, 3, and 12 do match that of the incoming packet ("TCP"). If the rule's protocol field does not match that of the incoming packet, the process proceeds to 1390. If the rule's protocol does match that of the incoming packet, the process proceeds to 1320.

The process compares (at 1320) the rule's source port field and destination port fields with that of the incoming packet and determines (at 1325) if the source port field and the destination field of the rule being examined match that of the incoming packet. In the example of FIG. 11, the source port field of the incoming packet 900 is "100" while its destination port field is "200". Rules 6 is therefore not a match because its destination port "443" does not match that of the incoming packet. Rule 5 is not a match because its destination port field is a range "1000-65535" that does not include the destination port of the incoming packet "200". On the other hand, rules 2, 3, 12, and 7 do have source and destination port specifications that are consistent with the incoming packet, as explicit "200" (of rule 2), range "≥80", wildcard "*", and range "≤234" are all compatible with destination port "200" of the incoming packet. If the rule's source and destination port fields do not match that of the incoming packet, the process proceeds to 1390. If the rule's port fields do match that of the incoming packet, the process proceeds to 1330.

At 1330, the process determines whether either source IP address field or the destination IP address field specifies an explicit address. As mentioned, in some embodiments, a source or destination address field of a rule can recite a container, an explicit IP address, or a wildcard. In the example of FIG. 11, the source and destination address field of rule 5 are both specified by explicit address ("13.0.0.0", and "12.0.0.0"), so is the destination address field of rule 2 ("13.0.0.0"). If there is an explicitly recited address in at least one of the address fields of the rule being examined, the process proceeds to 1340. Otherwise, the process proceeds to 1350 to see if any of the address fields recites a container.

At 1340, the process compares the explicitly recited address fields of the rule being examined with the incoming packet's corresponding fields. The process determines (at 1345) if the explicitly recited address in the rules matches that of the incoming packet. In the example of FIG. 11, the source IP of the packet 900 is "1.2.0.0", while the destination IP is "3.1.2.1". Rule 5, which explicitly recites "13.0.0.0" in source address and "12.0.0.0" as destination address would be directly compared with the source and destination IP of the packet 900 and found not matching. If the explicitly recited address fields of the rule being examined does match the corresponding address field of the incoming packet, the process proceeds to 1350. If the explicitly recited address fields of the rule being examined does not match the corresponding address field of the incoming packet the process proceeds to 1390.

At 1350, the process determines whether either source IP address field or the destination IP address field specifies a container. In the example of FIG. 11, rules 6, 3, and 7 in the list 990 use containers to specify source or destination IP address. If the rule being examined uses a container to specify either the source IP or destination IP address field, the process proceeds to 1360. Otherwise, the process proceeds to 1370.

At 1360, the process compares the containers specified by the rule being examined with the source and/or destination IP addresses of the incoming packet. The process then determines (at 1370) whether the container specified address fields match their corresponding address fields in the incoming packet. In other words, if the rule specifies a container in its source address field, the process determines if the source container includes the source IP address of the incoming packet. If the rule (also) specifies a container in its destination address field, the process (also) determines if the container includes the destination IP address of the incoming packet. In the example of FIG. 11, rule 6 would not be a match for the incoming packet, because its destination address field specifies "DB", which does not include the destination IP address "3.1.2.1" of the incoming packet. On the other hand, rule 3 could be a match for the incoming packet, because its source address container "Web" includes incoming packet's source address "1.2.0.0" and its destination address container "App" includes incoming packet's destination address "3.1.2.1". If the containers specified by the rule being examined do include the corresponding IP addresses of the incoming packet, the process proceeds to 1370. If a container specified by the rule being examined does not include the corresponding IP address in the incoming packet, the process 1390.

At 1370, the process indicates that the rule being examined is a matching rule. At this operation of the process 1300, the process has compares all five fields (protocol, source port, destination port, source IP, and destination IP) of the rule against incoming packet and determines that the rule is consistent with all five corresponding fields of the incoming packet. The process therefore indicates that the rule being examined is a matching rule. In some embodiments in which rules are examined according to priority, a rule being identified as a matching is the one final matching rule to be applied to the incoming packet. The process 1300 then ends.

At 1390, the process indicates that the rule is not a match. At this operation of the process 1300, the process has determined that there is at least one field in which the rule being examined that does not match the incoming packet. Furthermore, in some embodiments, the process 1300 proceeds here as soon as it has determined there is at least one field in which the rule being examined does not match the incoming packet. Therefore, in some embodiments, the process will not spend processing time to determine whether a container in a field of a rule matches (i.e., includes) a corresponding IP address in the incoming packet unless the rule matches the incoming packet in all other fields. After indicating that the rule being examined is not a match for the incoming packet, the process 1300 ends.

III. Communications Device

Figure 14:
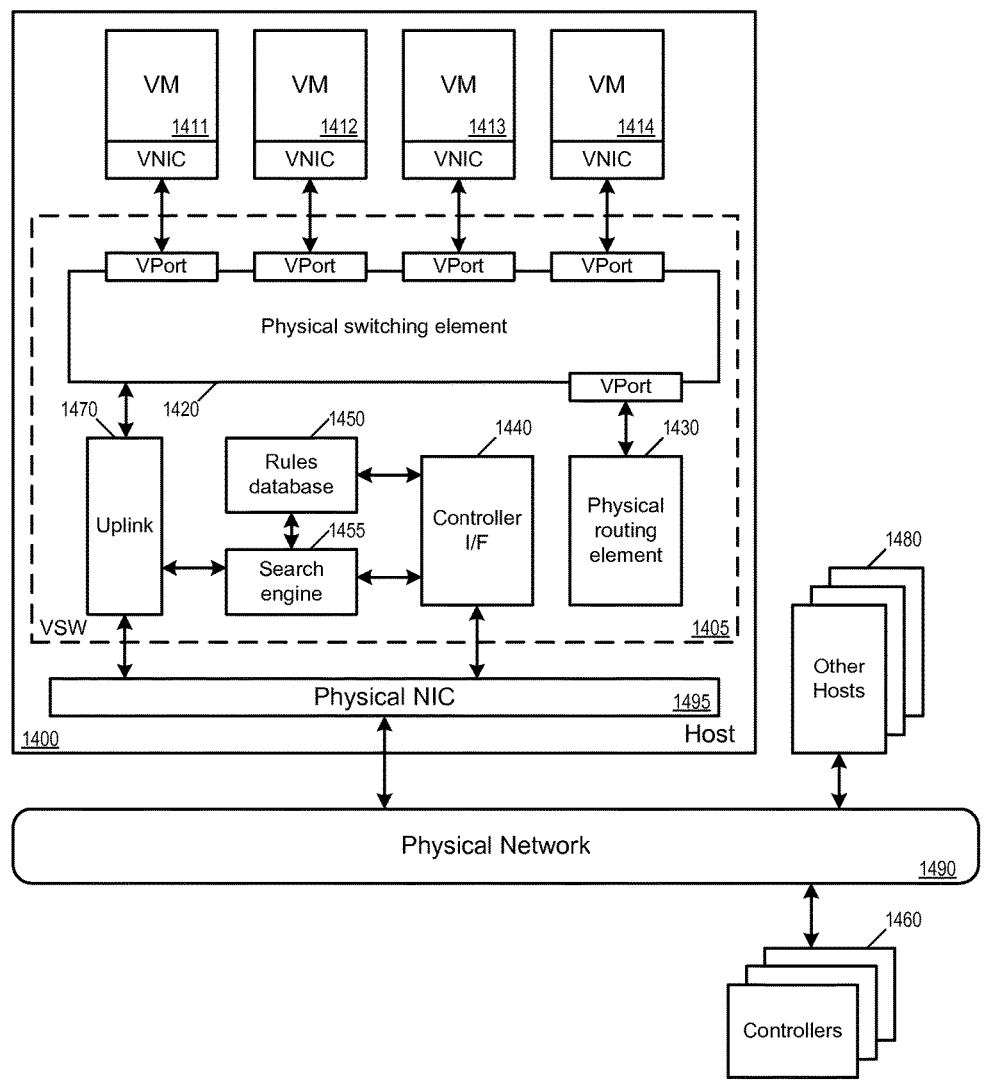
FIG. 14 illustrates an example host machine that is operating virtualization software.

As mentioned earlier, some embodiments of the invention are implemented by virtualization software or hypervisors running on host machines. For some embodiments, FIG. 14 illustrates an example host machine 1400 that is operating virtualization software 1405. The virtualization software 1405 allows the host machine to host virtual machines 1411-1414 as well as connecting the virtual machines to a physical network 1490. This physical network 1490 may span one or more data centers and include various physical switches and routers.

As illustrated, the host machine 1400 has access to the physical network 1490 through a physical NIC (PNIC) 1495. The virtualization software 1405 serves as the interface between the hosted VMs 1411-1414 and the physical NIC 1495 (as well as other physical resources, such as processors and memory). Each of the VMs includes a virtual NIC (VNIC) for accessing the network through the virtualization software 1405. Each VNIC in a VM is responsible for exchanging packets between the VM and the virtualization software 1405. In some embodiments, the VNICs are software abstractions of physical NICs implemented by virtual NIC emulators.

The virtualization software 1405 manages the operations of the VMs 1411-1414, and includes several components for managing the access of the VMs to the physical network (by implementing the logical networks to which the VMs connect, in some embodiments). As illustrated, the virtualization software 1405 includes a physical switching element 1420, a physical routing element 1430, a controller interface 1440, an uplink module 1470, a rules database 1450, and a rule search engine 1455.

The controller interface 1440 receives control plane messages from a controller or a cluster of controllers 1460. In some embodiments, these control plane message includes configuration data for configuring the various components of the virtualization software and/or the virtual machines (such as the physical switching element 1420 and the physical routing element 1430).

The rules database 1450 stores the complete set firewall rules. In some embodiments, the database includes multiple sets of firewall rules for different logical networks. The rule search engine 1455 uses various search structures, including container linking search structure to search for a rule from the rules database 1450 that matches packets that are incoming from the physical network 1490 through the PNIC 1495. The virtualization software 1405 then decides an action (e.g., block, allow, forward) with regard to the incoming packet based on the matching rule found by the search engine 1455.

The physical switching element 1420 delivers network data to and from the physical NIC 1495, which interfaces the physical network 1490. The physical switching element also includes a number of virtual ports (vPorts) that communicatively interconnects the physical NIC with the VMs 1411-1414, the physical routing element 1430 and the controller interface 1440. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 1490 (e.g., another VM running on another host).

The physical routing element 1430 performs L3 routing (e.g., by performing L3 IP address to L2 MAC address resolution) on data packets received from a virtual port on the physical switching element 1420. Each routed data packet is then sent back to the physical switching element 1420 to be forwarded to its destination according to the resolved L2 MAC address. This destination can be another VM connected to a virtual port on the physical switching element 1420, or a reachable L2 network element on the physical network 1490 (e.g., another VM running on another host, a physical non-virtualized machine, etc.).

The uplink module 1470 relays data between the physical switching element 1420 and the physical NIC 1495. In some embodiments, the uplink module 1470 allows the host machine 1400 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 1400 sends a data packet (e.g., an ethernet frame) to another VM in the same VXLAN network but on a different host, the uplink module 1470 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 1470 also decapsulates incoming VXLAN packets and forwards only the original inner data packet to the destination VM.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
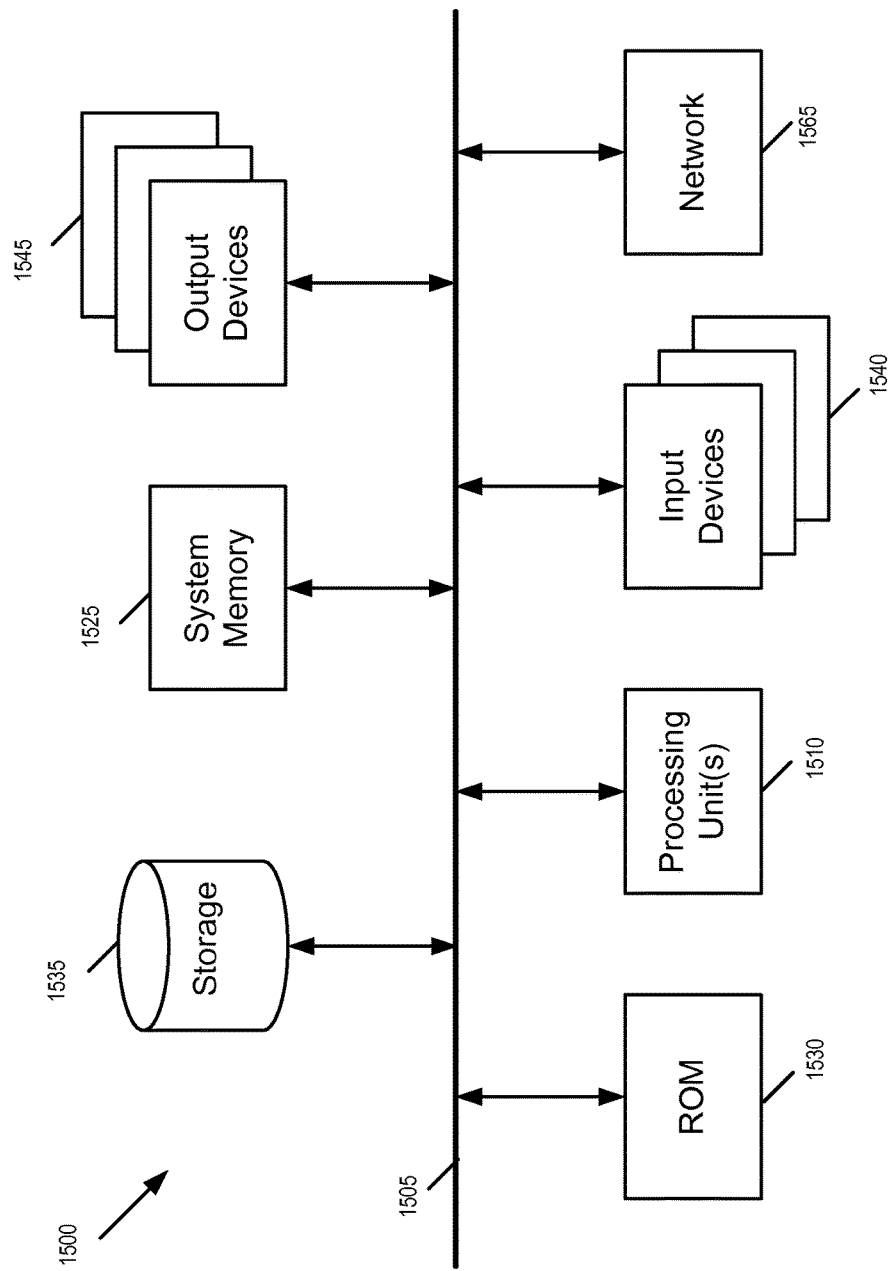
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 10, 12, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for classifying incoming packets to a computing device based on a set of rules, the method comprising:
   receiving an incoming packet from a network at the computing device;
   using an address-based search structure to identify a first set of potential matching rules for the incoming packet based on a source address and a destination address of the incoming packet;
   using a first port-based search structure to identify a second set of potential matching rules for the incoming packet, wherein each of the identified rules in the second set recites at least one of a source and a destination port of the incoming packet;
   using a second, different, port-based search structure to identify a third set of potential matching rules for the incoming packet, wherein each of the identified rules in the third set of rules recites a range of port identifiers that encompass at least one of the source port and the destination port of the incoming packet, wherein at least one identified rule in the second set and at least one identified rule in the third set recite a source port of the incoming packet; and
   by the computing device, identifying a matching rule to classify the incoming packet from the first, second, and third sets of potential matching rules.

2. The method of claim 1, wherein the first port-based search structure comprises a discrete port value search structure for identifying rules that specifies a single explicit value for at least one of its source or destination port field.

3. The method of claim 2, wherein the discrete port value search structure is a binary search tree, wherein each node in the binary search tree corresponds to a different discrete port value.

4. The method of claim 2, wherein the second port-based search structure comprises a port expression search structure for identifying rules that specifies a range or collection of ports values by using expressions or relational operators.

5. The method of claim 4, wherein the port expression search structure is a link list, wherein each node in the list corresponds to a different range or collection of port values.

6. The method of claim 1, wherein the matching rule is the highest priority rule that matches the incoming packet in five fields of a connection five-tuple.

7. A method for making forwarding decisions regarding incoming packets at a computing device, the method comprising:
   receiving a particular packet from a network at the computing device;
   using a set of attributes of the particular packet to identify a set of nodes in an address-based first tree graph search structure and a port-based second tree graph search structure to identify first and second sets of potential matching rules for the particular packet, each tree graph search structure comprising a plurality of nodes with each node (i) corresponding to at least one address or port, and (ii) identifying an associated set of rules associated with the node's corresponding address or port;
   examining each identified potential matching rule until a matching rule is found, wherein higher priority rules are examined before lower priority rules; and
   making a forwarding decision regarding the incoming packet using the matching rule.

8. The method of claim 7, wherein the port-based second tree graph search structure comprises a discrete port value tree graph search structure for identifying rules that specify a single explicit value for at least one of its source or destination port field.

9. The method of claim 8, wherein the discrete port value tree graph search structure is a binary search tree, wherein each node in the binary search tree corresponds to a different discrete port value.

10. The method of claim 8 further comprising using the set of attributes of the particular packet to identify a set of nodes in a port-based third search structure comprising a port expression search structure for identifying rules that specify a range or collection of ports values by using expressions or relational operators.

11. The method of claim 10, wherein the port expression search structure is a link list, wherein each node in the list corresponds to a different range or collection of port values.

12. The method of claim 7 further comprising using a protocol-based third search structure to identify a third set of potential matching rules for the incoming packet based on the protocol of the incoming packet, wherein the protocol-based search structure comprises nodes that correspond to rules that use wildcards to specify all fields except a protocol field.

13. The method of claim 7, wherein the address-based first tree graph search structure comprises nodes that correspond to addresses that are directly or indirectly recited by the set of rules in their source address fields or destination address fields.

14. A non-transitory machine readable medium storing a program for execution by a set of processing units, the program for making forwarding decisions regarding incoming packets at a computing device, the program comprising sets of instructions for:
   receiving a particular packet from a network at the computing device;
   using a set of attributes of the particular packet to identify a set of nodes in an address-based first tree graph search structure and a port-based second tree graph search structure to identify first and second sets of potential matching rules for the particular packet, each tree graph search structure comprising a plurality of nodes with each node (i) corresponding to at least one address or port, and (ii) identifying an associated set of rules associated with the node's corresponding address or port;
   examining each identified potential matching rule until a matching rule is found, wherein higher priority rules are examined before lower priority rules; and making a forwarding decision regarding the incoming packet using the matching rule.

15. The non-transitory machine readable medium of claim 14, wherein the port-based second tree graph search structure comprises a discrete port value tree graph search structure for identifying rules that specify a single explicit value for at least one of its source or destination port field.

16. The non-transitory machine readable medium of claim 15, wherein the discrete port value tree graph search structure is a binary search tree, wherein each node in the binary search tree corresponds to a different discrete port value.

17. The non-transitory machine readable medium of claim 15, the program further comprising a set of instructions for using the set of attributes of the particular packet to identify a set of nodes in a port-based third search structure comprising a port expression search structure for identifying rules that specify a range or collection of ports values by using expressions or relational operators.

18. The non-transitory machine readable medium of claim 17, wherein the port expression search structure is a link list, wherein each node in the list corresponds to a different range or collection of port values.

19. The non-transitory machine readable medium of claim 14, the program further comprising a set of instructions using a protocol-based third search structure to identify a third set of potential matching rules for the incoming packet based on the protocol of the incoming packet, wherein the protocol-based search structure comprises nodes that correspond to rules that use wildcards to specify all fields except a protocol field.

20. The non-transitory machine readable medium of claim 14, wherein the address-based first tree graph search structure comprises nodes that correspond to addresses that are directly or indirectly recited by the set of rules in their source address fields or destination address fields.

* * * * *